(12) United States Patent
Meier et al.

(10) Patent No.: US 10,580,102 B1
(45) Date of Patent: *Mar. 3, 2020

(54) APPARATUS AND METHODS FOR COMPUTERIZED OBJECT IDENTIFICATION

(71) Applicant: GoPro, Inc., San Mateo, CA (US)

(72) Inventors: Philip Meier, San Diego, CA (US);
Dimitry Fisher, San Diego, CA (US);
Chance Roth, San Diego, CA (US);
Steven Hypnarowski, Valley Center, CA (US)

(73) Assignee: GoPro, Inc., San Mateo, CA (US)

(*) Notice: Subject to any disclaimer, the term of this patent is extended or adjusted under 35 U.S.C. 154(b) by 257 days.

This patent is subject to a terminal disclaimer.

(21) Appl. No.: 15/858,637

(22) Filed: Dec. 29, 2017

Related U.S. Application Data

(63) Continuation of application No. 14/923,204, filed on Oct. 26, 2015, now Pat. No. 9,881,349.

(Continued)

(51) Int. Cl.
*G06T 1/00* (2006.01)
*G06K 9/46* (2006.01)

(52) U.S. Cl.
CPC .......... *G06T 1/0014* (2013.01); *G06K 9/4671* (2013.01)

(58) Field of Classification Search
CPC .................. G06K 9/4671; G06T 1/0014
See application file for complete search history.

(56) References Cited

U.S. PATENT DOCUMENTS 5,063,603 A    11/1991   Burt
5,138,447 A    8/1992    Shen
(Continued)

FOREIGN PATENT DOCUMENTS

CN    102226740 A    10/2011
EP    1089436 A2    4/2001
(Continued)

OTHER PUBLICATIONS

A Neural Network for Ego-motion Estimation from Optical Flow, by Branka, Published 1995.
(Continued)

*Primary Examiner* — Manuchehr Rahmjoo
(74) *Attorney, Agent, or Firm* — Young Basile Hanlon & MacFarlane, P.C.

(57) ABSTRACT

Apparatus and methods for identification of a coded pattern visible to a computerized imaging apparatus while invisible or inconspicuous to human eyes. A pattern and/or marking may serve to indicate identity of an object, and/or the relative position of the pattern to a viewer. While some solutions exist for identifying patterns (for example, QR codes), they may be visually obtrusive to a human observer due to visual clutter. In exemplary implementations, apparatus and methods are capable of generating patterns with sufficient structure to be used for either discrimination or some aspect of localization, while incorporating spectral properties that are more aesthetically acceptable such as being: a) imperceptible or subtle to the human observer and/or b) aligned to an existing acceptable visual form, such as a logo. In one variant, a viewer comprises an imaging system comprised as a processor and laser scanner, or camera, or moving photodiode.

15 Claims, 13 Drawing Sheets

Related U.S. Application Data

(60) Provisional application No. 62/068,166, filed on Oct. 24, 2014.

(56) References Cited

U.S. PATENT DOCUMENTS

| | | | |
|---|---|---|---|
| 5,216,752 A | 6/1993 | Tam | |
| 5,216,757 A | 6/1993 | Dorkin | |
| 5,271,535 A | 12/1993 | Fridman | |
| 5,272,535 A | 12/1993 | Elabd | |
| 5,355,435 A | 10/1994 | DeYong | |
| 5,638,359 A | 6/1997 | Peltola | |
| 5,652,594 A | 7/1997 | Costas | |
| 5,673,367 A | 9/1997 | Buckley | |
| 5,875,108 A | 2/1999 | Hoffberg | |
| 5,997,539 A | 12/1999 | Errico | |
| 6,009,418 A | 12/1999 | Cooper | |
| 6,014,653 A | 1/2000 | Thaler | |
| 6,035,389 A | 3/2000 | Grochowski | |
| 6,169,981 B1 | 1/2001 | Werbos | |
| 6,418,424 B1 | 7/2002 | Hoffberg | |
| 6,458,157 B1 | 10/2002 | Suaning | |
| 6,489,741 B1 | 12/2002 | Genov | |
| 6,509,854 B1 | 1/2003 | Morita | |
| 6,532,454 B1 | 3/2003 | Werbos | |
| 6,545,705 B1 | 4/2003 | Sigel | |
| 6,545,708 B1 | 4/2003 | Tamayama | |
| 6,546,291 B2 | 4/2003 | Merfeld | |
| 6,581,046 B1 | 6/2003 | Ahissar | |
| 6,601,049 B1 | 7/2003 | Cooper | |
| 6,625,317 B1 | 9/2003 | Gaffin | |
| 6,917,925 B2 | 7/2005 | Berenji | |
| 7,054,850 B2 | 5/2006 | Matsugu | |
| 7,565,203 B2 | 7/2009 | Greenberg | |
| 7,580,907 B1 | 8/2009 | Rhodes | |
| 7,639,886 B1 | 12/2009 | Rastogi | |
| 7,653,255 B2 | 1/2010 | Rastogi | |
| 7,737,933 B2 | 6/2010 | Yamano | |
| 7,765,029 B2 | 7/2010 | Fleischer | |
| 7,849,030 B2 | 12/2010 | Ellingsworth | |
| 8,000,967 B2 | 8/2011 | Taleb | |
| 8,015,130 B2 | 9/2011 | Matsugu | |
| 8,103,602 B2 | 1/2012 | Izhikevich | |
| 8,154,436 B2 | 4/2012 | Szajnowski | |
| 8,160,354 B2 | 4/2012 | Paquier | |
| 8,200,593 B2 | 6/2012 | Guillen | |
| 8,281,997 B2 * | 10/2012 | Moran | G06K 7/0004 235/449 |
| 8,311,965 B2 | 11/2012 | Breitwisch | |
| 8,315,305 B2 | 11/2012 | Petre | |
| 8,346,692 B2 | 1/2013 | Rouat | |
| 8,390,707 B2 | 3/2013 | Yamashita | |
| 8,416,847 B2 | 4/2013 | Roman | |
| 8,467,623 B2 | 6/2013 | Izhikevich | |
| 8,515,160 B1 | 8/2013 | Khosla | |
| 8,583,286 B2 | 11/2013 | Fleischer | |
| 8,655,815 B2 | 2/2014 | Palmer | |
| 8,712,939 B2 | 4/2014 | Szatmary | |
| 8,712,941 B2 | 4/2014 | Izhikevich | |
| 8,719,199 B2 | 5/2014 | Izhikevich | |
| 8,725,658 B2 | 5/2014 | Izhikevich | |
| 8,725,662 B2 | 5/2014 | Izhikevich | |
| 8,756,183 B1 | 6/2014 | Daily | |
| 8,775,341 B1 | 7/2014 | Commons | |
| 8,793,205 B1 | 7/2014 | Fisher | |
| 8,817,094 B1 | 8/2014 | Brown | |
| 8,943,008 B2 | 1/2015 | Ponulak | |
| 8,972,315 B2 | 3/2015 | Szatmary | |
| 8,977,582 B2 | 3/2015 | Richert | |
| 8,983,216 B2 | 3/2015 | Izhikevich | |
| 8,990,133 B1 | 3/2015 | Ponulak | |
| 8,996,177 B2 | 3/2015 | Coenen | |
| 2002/0038294 A1 | 3/2002 | Matsugu | |
| 2003/0050903 A1 | 3/2003 | Liaw | |
| 2003/0216919 A1 | 11/2003 | Roushar | |
| 2003/0222987 A1 | 12/2003 | Karazuba | |
| 2004/0054964 A1 | 3/2004 | Bozdagi | |
| 2004/0064609 A1 | 4/2004 | Sanma | |
| 2004/0066363 A1 | 4/2004 | Yamano | |
| 2004/0136439 A1 | 7/2004 | Dewberry | |
| 2004/0170330 A1 | 9/2004 | Fogg | |
| 2004/0193670 A1 | 9/2004 | Langan | |
| 2004/0220082 A1 | 11/2004 | Surmeier | |
| 2005/0004710 A1 | 1/2005 | Shimomura | |
| 2005/0015351 A1 | 1/2005 | Nugent | |
| 2005/0036649 A1 | 2/2005 | Yokono | |
| 2005/0096539 A1 | 5/2005 | Leibig | |
| 2005/0261803 A1 | 11/2005 | Seth | |
| 2005/0271289 A1 | 12/2005 | Rastogi | |
| 2005/0283450 A1 | 12/2005 | Matsugu | |
| 2006/0094001 A1 | 5/2006 | Torre | |
| 2006/0129728 A1 | 6/2006 | Hampel | |
| 2006/0161218 A1 * | 7/2006 | Danilov | A61B 5/0492 607/45 |
| 2007/0022068 A1 | 1/2007 | Linsker | |
| 2007/0176643 A1 | 8/2007 | Nugent | |
| 2007/0208678 A1 | 9/2007 | Matsugu | |
| 2008/0024345 A1 | 1/2008 | Watson | |
| 2008/0100482 A1 | 5/2008 | Lazar | |
| 2008/0154428 A1 | 6/2008 | Nagatsuka | |
| 2008/0162391 A1 | 7/2008 | Izhikevich | |
| 2008/0174700 A1 | 7/2008 | Takaba | |
| 2008/0199072 A1 | 8/2008 | Kondo | |
| 2008/0201282 A1 | 8/2008 | Garcia | |
| 2008/0237446 A1 | 10/2008 | Oshikubo | |
| 2008/0262812 A1 | 10/2008 | Arata | |
| 2008/0316362 A1 | 12/2008 | Qiu | |
| 2009/0043722 A1 | 2/2009 | Nugent | |
| 2009/0043777 A1 | 2/2009 | Wyler | |
| 2009/0287624 A1 | 11/2009 | Rouat | |
| 2010/0036457 A1 | 2/2010 | Sarpeshkar | |
| 2010/0081958 A1 | 4/2010 | She | |
| 2010/0086171 A1 * | 4/2010 | Lapstun | G06K 7/10772 382/100 |
| 2010/0100482 A1 | 4/2010 | Hardt | |
| 2010/0166320 A1 | 7/2010 | Paquier | |
| 2010/0198765 A1 | 8/2010 | Fiorillo | |
| 2010/0222924 A1 | 9/2010 | Gienger | |
| 2010/0225824 A1 | 9/2010 | Lazar | |
| 2010/0235310 A1 | 9/2010 | Gage | |
| 2010/0299296 A1 | 11/2010 | Modha | |
| 2011/0016071 A1 | 1/2011 | Guillen | |
| 2011/0119214 A1 | 5/2011 | Breitwisch | |
| 2011/0119215 A1 | 5/2011 | Elmegreen | |
| 2011/0134242 A1 | 6/2011 | Loubser | |
| 2011/0137843 A1 | 6/2011 | Poon | |
| 2011/0160741 A1 | 6/2011 | Asano | |
| 2011/0184556 A1 | 7/2011 | Seth | |
| 2011/0206122 A1 | 8/2011 | Lu | |
| 2011/0235698 A1 | 9/2011 | Petre | |
| 2012/0011090 A1 | 1/2012 | Tang | |
| 2012/0011093 A1 | 1/2012 | Aparin | |
| 2012/0036099 A1 | 2/2012 | Venkatraman | |
| 2012/0053728 A1 | 3/2012 | Theodorus | |
| 2012/0083982 A1 | 4/2012 | Bonefas | |
| 2012/0084240 A1 | 4/2012 | Esser | |
| 2012/0109863 A1 | 5/2012 | Esser | |
| 2012/0109866 A1 | 5/2012 | Modha | |
| 2012/0117012 A1 | 5/2012 | Szatmary | |
| 2012/0303091 A1 | 11/2012 | Izhikevich | |
| 2012/0308076 A1 | 12/2012 | Piekniewski | |
| 2012/0308136 A1 | 12/2012 | Izhikevich | |
| 2012/0330872 A1 | 12/2012 | Esser | |
| 2013/0019325 A1 | 1/2013 | Deisseroth | |
| 2013/0046716 A1 | 2/2013 | Chan | |
| 2013/0073080 A1 | 3/2013 | Ponulak | |
| 2013/0073484 A1 | 3/2013 | Izhikevich | |
| 2013/0073491 A1 | 3/2013 | Izhikevich | |
| 2013/0073492 A1 | 3/2013 | Izhikevich | |
| 2013/0073493 A1 | 3/2013 | Modha | |
| 2013/0073495 A1 | 3/2013 | Izhikevich | |
| 2013/0073496 A1 | 3/2013 | Szatmary | |
| 2013/0073498 A1 | 3/2013 | Izhikevich | |
| 2013/0073499 A1 | 3/2013 | Izhikevich | |

(56) References Cited

U.S. PATENT DOCUMENTS

| | | |
|---|---|---|
| 2013/0073500 A1 | 3/2013 | Szatmary |
| 2013/0103626 A1 | 4/2013 | Hunzinger |
| 2013/0117212 A1 | 5/2013 | Hunzinger |
| 2013/0151450 A1 | 6/2013 | Ponulak |
| 2013/0204814 A1 | 8/2013 | Hunzinger |
| 2013/0204820 A1 | 8/2013 | Hunzinger |
| 2013/0218821 A1 | 8/2013 | Szatmary |
| 2013/0251278 A1 | 9/2013 | Izhikevich |
| 2013/0297539 A1 | 11/2013 | Piekniewski |
| 2013/0297541 A1 | 11/2013 | Piekniewski |
| 2013/0297542 A1 | 11/2013 | Piekniewski |
| 2013/0304683 A1 | 11/2013 | Lo |
| 2013/0325766 A1 | 12/2013 | Petre |
| 2013/0325768 A1 | 12/2013 | Sinyayskiy |
| 2013/0325773 A1 | 12/2013 | Sinyayskiy |
| 2013/0325775 A1 | 12/2013 | Sinyayskiy |
| 2013/0325777 A1 | 12/2013 | Petre |
| 2014/0012788 A1 | 1/2014 | Piekniewski |
| 2014/0016858 A1 | 1/2014 | Richert |
| 2014/0025613 A1 | 1/2014 | Ponulak |
| 2014/0032458 A1 | 1/2014 | Sinyavskiy |
| 2014/0032459 A1 | 1/2014 | Sinyavskiy |
| 2014/0052679 A1 | 2/2014 | Sinyavskiy |
| 2014/0064609 A1 | 3/2014 | Petre |
| 2014/0089232 A1 | 3/2014 | Buibas |
| 2014/0122397 A1 | 5/2014 | Richert |
| 2014/0122398 A1 | 5/2014 | Richert |
| 2014/0122399 A1 | 5/2014 | Szatmary |
| 2014/0122400 A1 | 5/2014 | Szatmary |
| 2014/0156574 A1 | 6/2014 | Piekniewski |
| 2014/0193066 A1 | 7/2014 | Richert |
| 2014/0222739 A1 | 8/2014 | Ponulak |
| 2014/0257595 A1 | 9/2014 | Tillmann |
| 2014/0310220 A1 | 10/2014 | Chang |
| 2014/0379623 A1 | 12/2014 | Piekniewski |
| 2015/0005937 A1 | 1/2015 | Ponulak |
| 2015/0120626 A1 | 4/2015 | Gupta |

FOREIGN PATENT DOCUMENTS

| | | |
|---|---|---|
| JP | H0487423 A | 3/1992 |
| RU | 2108612 C1 | 4/1998 |
| RU | 2406105 C2 | 12/2010 |
| RU | 2424561 C2 | 7/2011 |
| WO | 2008083335 A2 | 7/2008 |
| WO | 2008132066 A1 | 11/2008 |

OTHER PUBLICATIONS

Aleksandrov (1968), Stochastic optimization, Engineering Cybernetics, 5, 11-16.

Amari (1998), Why natural gradient?, Acoustics. Speech and Signal Processing, (pp. 1213-1216). Seattle, WA, USA.

Baras, D. et al. "Reinforcement learning, spike-time-dependent plasticity, and the BCM rule." Neural Computation vol. 19 No. 8 (2007): pp. 2245-2279.

Bartlett et al., (2000) "A Biologically Plausible and Locally Optimal Learning Algorithm for Spiking Neurons" Retrieved from http://arp.anu.edu.au/ftp/papers/jon/brains,pdf.

Baxter et al., (2000), Direct gradient-based reinforcement learning, in Proceedings of the International Symposium on Circuits and Systems, (pp. III-271-274).

Bennett, M.R., (1999), The early history of the synapse: from Plato to Sherrington. Brain Res. Boll., 50(2): 95-118.

Berkes and Wiskott. Slow feature analysis yields a rich repertoire of complex cell properties. Journal of Vision (2005) vol. 5 (6).

Bertsekas, Dimitri P., and Dimitri P. Bertsekas. Dynamic programming and optimal control. vol. 1. No. 2. Belmont, MA: Athena Scientific, 1995.

Bertsekas, Dimitri P., "Approximate dynamic programming." (2011).

Blais B.S., et al., "BCM Theory," Scholarpedia, 2008, vol. 3 (3), 13 pages.

Bohte et al., (2000), Spike Prop: backpropagation for networks of spiking neurons, In Proceedings of ESANN'2000, (pp. 419-424).

Bohte et al., "A Computational Theory of Spike-Timing Dependent Plasticity: Achieving Robust Neural Responses via Conditional Entropy Minimization" 2004.

Bohte, 'Spiking Nueral Networks' Doctorate at the University of Leiden, Holland, Mar. 5, 2003, pp. 1-133 [retrieved on Nov. 14, 2012]. Retrieved from the internet: <URL: http://homepages.cwi.nl/-sbohte/publication/phdthesis.pdf>.

Booij(2005). A Gradient Descent Rule for Spiking Neurons Emitting Multiple Spikes. Information Processing Letters No. 6. vol. 95 , 552-558.

Breiman et al., "Random Forests" 33pgs, Jan. 2001.

Brette et al., Brian: a simple and flexible simulator for spiking neural networks, The Neuromorphic Engineer, Jul. 1, 2009, pp. 1-4, doi: 10.2417/1200906.1659.

Brette, et al., "Simulation ofNetworks of Spiking Neurons: A Review of Tools and Strategies", Received Nov. 29, 2006, Revised Apr. 2, 2007, Accepted Apr. 12, 2007, Springer Science, 50 pages.

Capel, "Random Forests and ferns" LPAC, Jan. 1, 2012, 40 pgs.

Cessac et al. 'Overview of facts and issues about neural coding by spikes.' Journal of Physiology, Paris 104.1 (2010): 5.

Chistiakova, Marina, and Maxim Volgushev. "Heterosynaptic plasticity in the neocortex." Experimental brain research 199.3-4 (2009): 377-390.

Christo Panchev, "Temporal Processing in a Spiking Model of the Visual System", S. Kollias et al. (Eds.): ICANN 2006, Part 1, LNCS 4131, Springer-Verlag, Berlin, 2006, pp. 750-759.

Competitive behaviors of a spiking neural network with spike timing dependent plasticity, Chengmei Ruan ; Qingxiang Wu ; Lijuan Fan ; Zhiciiang Zhuo ; Xiaowei Wang, Biomedical Engineering and Informatics (BMEI), 2012 5th International Conference on DOI: 10.1109/BMEI.2012.6513088 Publication Year: 2012 , pp. 1015-1019.

Cuntz et al., 'One Rule to Grow Them All: A General Theory of Neuronal Branching and Its Paractical Application' PLOS Computational Biology, 6 (8), Published Aug. 5, 2010, pp. 1-14.

Dan Y., et al., "Spike Timing-dependent Plasticity of Neural Circuits," Neuron, 2004, vol. 44 (1), pp. 23-30.

Davison et al., PyNN: a common interface for neuronal network simulators, Frontiers in Neuroinformatics, Jan. 2009, pp. 1-10, vol. 2, Article 11.

De Queiroz, M. et al. "Reinforcement learning of a simple control task using the spike response model." Neurocomputing vol. 70 No. 1 (2006): pp. 14-20.

Djurfeldt, Mikael, The Connection-set Algebra: a formalism for the representation of connectivity structure in neuronal network models, implementations in Python and C++, and their use in simulators BMC Neuroscience Jul. 18, 2011 p. 1 12(Suppl 1):P80.

Dorval et al. 'Probability distributions of the logarithm of interspike intervals yield accurate entropy estimates from small datasets.' Journal of neuroscience methods 173.1 (2008): 129.

El-Laithy (2011), A reinforcement learning framework for spiking networks with dynamic synapses, Comput Intel! Neurosci.

Fidjeland, et al., 'Accelerated Simulation of Spiking Neural Networks Using GPUs,' WCCI 2010 IEEE World Congress on Computational Intelligience, Jul. 18-23, 2010—CCIB, Barcelona, Spain, pp. 536-543, [retrieved on Nov. 14, 2012]. Retrieved from the Internet: URL:http://www.doc.ic.ac.ukl-mpsha/IJCNN10b.pdf.

Field, G.; Chichilnisky, E, Information Processing in the Primate Retina: Circuitry and Coding. Annual Review of Neuroscience, 2007, 30(1), 1-30.

Fiete, et al, Spike-Time-Dependent Plasticity and Heterosynaptic Competition Organize Networks to Produce Long Scale-Free Sequences of Neural Activity. Neuron 65, Feb. 25, 2010, pp. 563-576.

Fletcher (1987), Practical methods of optimization, New York, NY: Wiley-Interscience.

Floreano et al., 'Neuroevolution: from architectures to learning' Evol. Intel. Jan. 1, 2008: pp. 47-62, [retrieved Dec. 30, 2013] [retrieved online from URL:<http:// inforscience.epfl.ch/record/112676/files/FloreanoDuerrMattiussi2008.pdf>.

(56) References Cited

OTHER PUBLICATIONS

Florian (2005), A reinforcement learning algorithm for spiking neural networks SYNASC '05 Proceedings of the Seventh International Symposium on Symbolic and Numeric Algorithms for Scientific Computing.

Florian03, Biologically Inspired Neural Networks for the Control of Embodied Agents, Technical Report Coneural-03-03 Version 1.0 [online], Nov. 30, 2003 [retrieved on Nov. 24, 2014]. Retrieved from the Internet: <URL:http://citeseerxist.psu.edu/viewdoc/download?doi=10.1.1.216.4931-&rep1&type=pdf&a.

Foldiak, P. Learning invariance from transformation sequences. Neural Computation, 1991, 3(2), 194-200.

Fremaux. N. et al., "Functional Requirements for Reward-Modulated Spike-Timing-Dependent Plasticity", The Journal of Neuroscience, Oct. 6, 2010, 30 (40):13326-13337.

Froemke et al., Temporal modulation of spike-timing-dependent plasticity, Frontiers in Synaptic Neuroscience, vol. 2, Article 19, pp. 1-16 [online] Jun. 2010 [retrieved on Dec. 16, 2013]. Retrieved from the internet: <frontiersin.org.

Fu (2005) Stochastic Gradient Estimation, Technical Research Report.

Fu (2008), What You Should Know About Simulation and Derivatives Naval Research Logistics, vol. 55, No. 8 , 723-736.

Fyfe et al., (2007), Reinforcement Learning Reward Functions for Unsupervised Learning, ISNN '07 Proceedings of the 4th international symposium on Neural Networks: Advances in Neural Networks.

Gerstner (2002), Spiking neuron models: single neurons, populations, plasticity, Cambridge, U.K.: Cambridge University Press.

Gerstner et al. (1996) A neuronal learning rule for sub-millisecond temporal coding. Nature vol. 383 (6595) pp. 76-78.

Gewaltig et al., 'NEST (Neural Simulation Tool)', Scholarpedia, 2007, pp. 1-15, 2(4): 1430, doi: 1 0.4249/scholarpedia.1430.

Glackin, C. et al., Feature Extraction from Spectra-temporal Signals using Dynamic Synapses, recurrency, and lateral inhibition, Neural Networks (IJCNN), The 2010 International Joint Conference on DOI: 10.1109/IJCNN.2010.5596818 Publication Year: 2010, pp. 1-6.

Gleeson et al., NeuroML: A Language for Describing Data Driven Models of Neurons and Networks with a High Degree of Biological Detail, PLoS Computational Biology, Jun. 2010, pp. 1-19 vol. 6 Issue 6.

Gluck, Stimulus Generalization and Representation in Adaptive Network Models of Category Learning [online], 1991 [retrieved on Aug. 24, 2013]. Retrieved from the Internet:&Ir;URL:http://www.google.conlurl?sa-t&rct-J&q-Giuck+ 4)/022Stimulus+Generalization+and+Representatio n+1N+Adaptive+Network+Modelsof+Category+Learn i ng%22+ 1991.

Glynn (1995), Likelihood ratio gradient estimation for regenerative stochastic recursion Advances in Applied Probability 27.4. 1019-1053.

Gollisch et al., 'Rapid neural coding in the retina with relative spike latencies.' Science 319.5866 (2008): 1108-1111.

Goodman et al, Brian: a simulator for spiking neural networks in Python, Frontiers in Neuroinformatics, Nov. 2008, pp. 1-10, vol. 2, Article 5.

Gorchetchnikov et al., NineML: declarative, mathematically-explicit descriptions of spiking neuronal networks, Frontiers in Neuroinformatics, Conference Abstract: 4th INCF Congress of Neuroinformatics, doi: 1 0.3389/conf.fninf.2011.08.00098, 2 pgs.

Govindhasamy, James J., Sean F. McLoone, and George W. Irwin. "Sequential learning for adaptive critic design: An industrial control application." Machine Learning for Signal Processing, 2005 IEEE Workshop on. IEEE, 2005.

Graham, Lyle J., The Surf-Hippo Reference Manual, http://www.neurophys.biomedical.univparisS. fr/-graham/surf-hippo-files/Surf-Hippo% 20Reference%2QManual.pdf, Mar. 2002, pp. 1-128.

Hagras, Hani, et al., "Evolving Spiking Neural Network Controllers for Autonomous Robots", IEEE 2004.

Hanselmann T., et al., "Continuous-time Adaptive Critics," IEEE Transactions on Neural Networks, 2007, vol. 18 (3), pp. 631-647.

Ho, "Random Decision Forests" Int'l Conf. Document Analysis and Recognition, 1995, 5 pgs.

Hopfield JJ (1995) Pattern recognition computation using action potential timing for stimulus representation.Nature 376: 33-36.

Huang, Fall Detection Using Modular Neural Networks with Back-projected Optical Flow, Published 2007.

In search of the artificial retina [online]. Vision Systems Design. Apr. 1, 2007.

Itti, Laurent, and Christof Koch. 'Computational modelling of visual attention.'Nature reviews neuroscience 2.3 (2001): 194-203.

Izhikevic, F. (2007), Solving the Distal Reward Problem through Linkage of ST DP and Dopamine Signaling, Cerebral Cortex, vol. 17, 2443-2452.

lzhikevich E. M, and Hoppensteadt F.C. (2009) Polychronous Wavefront Computations. International Journal of Bifurcation and Chaos, 19:1733-1739.

lzhikevich E.M. (2004) Which Model to Use for Cortical Spiking Neurons? IEEE Transactions on Neural Networks, 15:1063-1070.

lzhikevich, 'Polychronization: Computation with Spikes', Neural Computation, 25, 2006, 18, 245-282.

lzhikevich, E,M. (2007) Dynamical Systems in Neuroscience: The Geometry of Excitability and Bursting, The MIT Press, 2007.

Izhikevich E.M., 'Neural Excitability, Spiking and Bursting', Neurosciences Institute, Received Jun. 9, 1999, Revised Oct. 25, 1999, 1171-1266, 96 pages.

lzhikevich et al., 'Relating STDP to BCM', Neural Computation (2003) 15, pp. 1511-1523.

Izhikevich, Eugene M., Dynamical systems in neuroscience: chapters 1 and 2, MIT press, 2007.

lzhikevich, 'Simple Model of Spiking Neurons'IEEE Transactions on Neural Networks, vol. 14, No. 6, Nov. 2003, pp. 1569-1572.

Janowitz, M.K.; Van Rossum, M.C.W. Excitability changes that complement Hebbian learning. Network, Computation in Neural Systems, 2006, 17 (1), 31-41.

Kaelbling, Leslie, et al., "Reinforcement Learning: A Survey" Journal of Artificial Intelligence Research, 4 (1996), pp. 237-285.

Kalal et al. Online learning of robust object detectors during unstable tracking published on 3rd On-line Learning for Computer Vision Workshop 2009, Kyoto, Japan, IEEE CS.

Karbowski et al., 'Multispikes and Synchronization in a Large Neural Network with Temporal Delays', Neural Computation 12; (2000), pp. 1573-1606.

Kasabov, 'Evolving Spiking Neural Networks for Spatio-and Spectro-Temporal Pattern Recognition', IEEE 6th International Conference 'Intelligent Systems' 2012 [Retrieved on Jun. 24, 2014], Retrieved from internet: <http:// ncs.ethz.ch/projects/evospike/publications/evolving-spiking-neural-networks-for-spatio-and-spectro-temporal-pattem-recognition-plenary-talk-ieee-is>.

Kazantsev, et al., 'Active Spike Transmission in the Neuron Model With a Winding Threshold Maniford', Jan. 3, 2012,205-211,7 pages.

Kenji Doya (2000), Reinforcement Learning in Continuous Time and Space, Neural Computation, 12:1. 219-245.

Khotanzad, 'Classification of invariant image representations using a neural network' IEEF. Transactions on Acoustics, Speech, and Signal Processing, vol. 38, No. 6, Jun. 1990, pp. 1028-1038 [online], [retrieved on Dec. 10, 2013]. Retrieved from the Internet <URL: http://www-ee.uta.edu/eeweb/IP/Courses/SPR/Reference/Khotanzad.pdf>.

Kiefer (1952), Stochastic Estimation of the Maximum of a Regression Function, Annals of Mathematica[ Statistics 23, #3, 462-466.

Klampfl (2009), Spiking neurons can learn to solve information bottleneck problems and extract independent components, Neural Computation, 21(4), pp. 911-959.

Kleijnen et al., Optimization and sensitivity analysis of computer simulation models by the score function method Invited Review European Journal of Operational Research, Mar. 1995.

Kling-Petersen, PhD, "Sun and HPC: From Systems to PetaScale" Sun Microsystems, no date, 31 pages.

Klute et al., "Artificial Muscles: Actuators for Biorobotic Systems," The International Journal Robotics Research, 2002, vol. 21, pp. 295-309.

(56) References Cited

OTHER PUBLICATIONS

Knoblauch A., et al., 'Memory Capacities for Synaptic and Structural Plasticity,' Neural Computation, 2010, vol. 22 (2), pp. 289-341.
Knoblauch, et at Memory Capacities for Synaptic and Structural Plasticity, Neural Computation 2009, pp, 1-45.
Larochelle et al., (2009), Exploring Strategies for Training Deep Neural Networks, J. of Machine Learning Research, v. 10, pp. 1-40.
Lars Buesing, Wolfgang Maass, "Simplified Rules and Theoretical Analysis for Information Bottleneck Optimization and PCA with Spiking Neurons", NIPS Proceedings, 2007, "http:I/papers.nips.cc/paper/3168-simplified-rules-and-theoretical-analysis-forinforrnation-bottleneck-optimization-and-pea-with-spiking-neurons", 2007, pp. 1-8.
Laurent, 'The Neural Network Query Language (NNQL) Reference' [retrieved on Nov. 12, 2013]. 1 pg., Retrieved from the Internet: <URL https://code.google.com/p/nnql/issues/detail?id=1>.
Lazar et a]. 'Multichannel time encoding with integrate-and-fire neurons.' Neurocomputing 65 (2005): 401-407.
Lazar et al. 'A video time encoding machine', in Proceedings of the 15th IEEE International Conference on Image Processing (ICIP '08 2008, pp. 717-720.
Lazar., et al., "Consistent recovery of sensory stimuli encoded with MIMO neural circuits," Computational intelligence and neuroscience, 2009.
Lazar et al. 'Consistent recovery of sensory stimuli encoded with MIMO neural circuits.' Computational intelligence and neuroscience (2010): 2.
Legenstein, R., et al. (2008), .A learning theory for reward-modulated spike timingsdependent plasticity with application to biofeedback. PLoS Computational Biology. 4(10): 1-27.
Lendek Babushka Z.S., and De Schutter B. (2006) State Estimation under Uncertainty—. A Survey: Technical report 06-004 Deth Center for systems and Control Delft University of Technology.
Leydesdorff L., et al., 'Classification and Powerlaws: The Logarithmic Transformation, Journal of the American Society for Information Science and Technology (forthcoming)', 2006.
Li, Zhaoping. "A saliency map in primary visual cortex." Trends in cognitive sciences 6.1 (2002): 9-16.
Lin, Long-Ji. "Self-improving reactive agents based on reinforcement learning, planning and teaching." Machine learning 8.3-4 (1992): 293-321.
Lyle N. Long and Ankur Gupta, "Biologically-Inspired Spiking Neural Networks with Hebbian Learning for Vision Processing", AIAA Paper No. 2008-0885, presented at AIAA 46th Aerospace Sciences Meeting, Reno NV Jan. 2008, pp. 1-17.
Markram, Henry, et al. "Regulation of synaptic efficacy by coincidence of postsynaptic APs and EPSPs." Science 275.5297 (1997): 213-215.
Martinez-Perez, et al., "Automatic Activity Estimation Based on Object Behavior Signature", 2010, 10 pages.
Masakazu et al, "Convolutional Spiking Neural Network Model for Robust Face Detection", Proceedings of the 9th International Conference on Neural Information Processing (ICONIP'02), vol. 2, 2002, pp. 660-664.
Masquelier and Thorpe, Learning to recognize objects using waves of spikes and Spike Timing-Dependent Plasticity. Neural Networks (IJCNN), The 2010 International Joint Conference on DOI—10.1109/1JCNN.2010.5596934 (2010) pp. 1-8.
Masquelier, Timothee, 'Relative spike time coding and STOP-based orientation selectivity in the early visual system in natural continuous and saccadic vision: a computational model.' Journal of computational neuroscience 32.3 (2012): 425-441.
Matsugu, et al., "Convolutional Spiking Neural Network for Robust Object Detection with Population Code Using Structured Pulse Packets", 2004, 39-55, 17 pages.
Medini. C., et al., Modeling Cerebellar Granular layer Excitability and Combinatorial Computation with Spikes, Bio-Inspired Computing: Theories and Applications (BIC-TA), 2010 IEEE Fifth International Conference on DOI: 10.1 109/BICTA.201 0.5645274, Publication Year: 2010, pp. 1495-1503.
Meinhardt, Hans, and Alfred Gierer. 'Pattern formation by local self-activation and lateral inhibition.' Bioessays 22.8 (2000): 753-760.
Meister, M.; Berry, M.J. The neural code of the retina, Neuron, 1999, 22, 435-450.
Meister, M, Multineuronal codes in retinal signaling. Proceedings of the National Academy of sciences. 1996, 93, 609-614.
N Venkateswaran, B Harish, R Chidambareswaran, "A Novel Perspective into the Neuronal Encoding Along the Retinal Pathway Employing Time-Frequency Transformation: Part II-For Color", Brain Inspired Cognitive systems, 2004, pp. BIS4-31-BIS4-37.
Natalia C., et al., "Spike Timing-dependent Plasticity: a Hebbian Learning Rule," Annual Review of Neuroscience, 2008, vol. 31, pp. 25-46.
Nichols, A Re configurable Computing Architecture for Implementing Artificial Neural Networks on FPGA, Master's Thesis, The University of Guelph, 2003, pp. 1-235.
Nikolic, K., San Segundo Bello D.. Delbruck T, Liu, S.. and Roska, B. High-sensitivity silicon retina for robotics and prosthetics 2011.
Niv, et al., Evolution of Reinforcement Learning in Uncertain Environments: A Simple Explanation for Complex Foraging Behaviors, International Society for Adaptive Behavior, 2002, vol. 10(1), pp. 5-24.
Oja, Erkki (2008), Scholarpedia "Oja learning rule.".
Ojala et al., "Performance Evaluation of Texture Measures with Classification Based on Kullback Discrimination of Distributions" 1994 IEEE, pp. 582-585.
Oster M., Lichtsteiner P Delbruck T, Liu S, A Spike-Based Saccadic Recognition System, ISCAS 2007. IEEE International Symposium on Circuits and Systems, 2009, pp. 3083-3086.
Ostojic, Srdjan, Nicolas Brunel, From Spiking Neuron Models to Linear-Nonlinear Models, Jan. 2011, vol. 7 (1), e1001056.
Ozuysal et al., "Fast Keypoint Recognition in len Lines of Code" CVPR 2007.
Ozuysal et al., "Fast Keypoint Recognition Using Random Ferns" IEEE Transactions on Pattern Analysis and Machine Intelligence, vol. 32, No. 3, Mar. 2010. pp. 448-461.
Paugam-Moisy et al., 'Computing with spiking neuron networks' G. Rozenberg T. Back, J. Kok (Eds.), Handbook of Natural Computing, Springer-Verlag (2010) [retrieved Dec. 30, 2013], [retrieved online from link.springer.com], 5 pgs.
Paugam-Moisy, et al., "Computing with Spiking Neuron Networks" Handbook of Natural Computing, 40 pages Springer, Heidelberg (2009).
Pavlidis et al. Spiking neural network training using evolutionary algorithms. In: Proceedings 2005 IEEE International Joint Conference on Neural Nelworkds, 2005. UCNN'05, vol. 4, pp. 2190-2194 Publication Date Jul. 31, 2005 [online] [Retrieved on Dec. 10, 2013] Retrieved from the Internet <URL: http://citeseerx.ist.psu.edu/viewdoe/down!oad?doi=10.1.1.5.4346&rep=:rep1&type=pdf.
PCT International Search Report and Written Opinion for PCT/US2014/48512 dated Jan. 23, 2015, pp. 1-14.
Pfister (2003), Optimal Hebbian Learning: A Probabilistic Point of View. In ICANN Proceedings. Springer, pp. 92-98.
Pfister (2006), Optimal Spike-Timing Dependent Plasticity for Precise Action Potential Firing in Supervised Learning, Neural computation ISSN 0899-7667, 18 (6).
Phenomenological models of synaptic plasticity based on spike timing Abigail Morrison Markus Diesmann Wulfram Gerstner Received: Jan. 16, 2008 / Accepted: Apr. 9, 2008 The Author(s) 2008.
Ponulak, "Analysis of the Resume learning Process for Spiking Neural Networks," International Journal of Applied Mathematics & Computer Science, 2008, vol. 18 (2), pp. 117-127.
Ponulak, F., (2005), ReSuMe—New supervised learning method for Spiking Neural Networks. Technical Report, Institute of Control and Information Engineering, Poznan University of Technology.
Ponulak, F., Kasinski, A.: Supervised learning in spiking neural networks with ReSuMe: sequence learning, classification, and spike shifting. Neural Comp .22(2): 467-510.

(56) References Cited

OTHER PUBLICATIONS

Prokhorov, Danil V., and Lee A. Feldkamp. "Primitive adaptive critics." Neural Networks, 1997., International Conference on. vol. 4. IEEE, 1997.
QingXiang Wu et al, Edge Detection Based on Spiking Neural Network Model, ICIC 2007, LNAI 4682, pp. 26-34,2007, Springer-Verlag, Berlin Heidelberg.
Rafael Serrano-Gotarredona, Teresa Serrano-Gotarredona, Antonio Acosta-Jimenez, and Bernabe Linares-Barranco, "A Neuromorphic Cortical-Layer Microchip for Spike-Based Event Processing Vision Systems", Circuits and Systems 1: Regular Papers, IEEE Transactions on (vol. 53, Issue: 12), Dec. 12, 2006, pp. 2548-2566.
Ramachandran, et al., 'The Perception of Phantom Limbs', The D.O. Hebb Lecture, Center for Brain and Cognition, University of California, 1998, 121, 1603-1630,28 pages.
Rebecca L. VislayMeltzer, Adam R. kampff, Florian Engert, "Spatiotemporal Specificity of neurol activity directs the modification of receptive fields in the developing retinotectal system", neuron 50, Apr. 6, 2006, pp. 101-114.
Reiman et al. (1989). Sensitivity analysis for simulations via likelihood ratios. Oper Res 37, 830-844.
Reinforcement Learning in Intelligent Control: A Biologically-Inspired Approach to the Relearning Problem. Brendan D'Cruz May (1998).
Reinforcement Learning Through Modulation of Spike-Timing-Dependent Synaptic Plasticity, Razvan V. Florian Neural Computation 19, 1468-1502 (2007) Massachusetts Institute of Technology.
Rekeczky, et al., "Cellular Multiadaptive Analogic Architecture: A Computational Framework for UAV Applications." May 2004.
Revow M., Williams C and Hinton, G.E., 1996. Using Generative Models for Handwritten Digit Recognition, IEEE Trans. on Pattern Analysis and Machine Intelligence, 18, No. 6, Jun. 1996.
Robbins (1951), A Stochastic Approximation Method, Annals of Mathematical Statistics 22, #3, 400-407.
Rosenstein et al., (2002), Supervised learning combined with an actor-critic architecture, Technical Report 02-41, Department of Computer Science, University of Massachusetts, Amherst.
Rumelhart (1986), Learning internal representations by error propagation, Parallel distributed processing, vol. 1 (pp. 318-362), Cambridge, MA: MIT Press.
Rumelhart et a[., (1986), Learning representations by back-propagating errors, Nature 323 (6088) , pp. 533-536.
Sanchez, Efficient Simulation Scheme for Spiking Neural Networks. Doctoral Thesis. (Juiversita di Granada Mar. 28, 2008, pp. 1-104.
Sato et al., 'Pulse interval and width modulation for video transmission.' Cable Television, IEEE Transactions on 4 (1978): 165-173.
Schemmel, J., et al., Implementing Synaptic Plasticity in a VLSI Spiking Neural Network Model. In: Proceedings of the 2006 International Joint Conference on Neural Networks (IJCNN'06), IEEE Press (2006) Jul. 16-21, 2006, pp. 1-6 [online], [retrieved on Aug. 24, 2012]. Retrieved from the Internet <URL: http://www.kip.uniheidelberg.deNeroeffentlichungen/download.cgi/4620/ps/1774.pdf> Introduction.
Schnitzer, M.J.; Meister, M.; Multineuronal Firing Patterns in the Signal from Eye to Brain. Neuron, 2003, 37, 499-511.
Schrauwen et al., "Improving SpikeProp: Enhancements to an Error-Backpropagation Rule for Spiking Neural Networks", ProsRISC Workshop, 2004, pp. 301-305.
Schreiber S., et al., "A New Correlation-based Measure of Spike Timing Reliability," Neurocomputing, 2003, vol. 52-54, pp. 925-931.
Serrano-Gotarredona, et al, "On Real-Time: AER 2-D Convolutions Hardware for Neuromorphic Spike-based Cortical Processing", Jul. 2008.
Seung. H. "Learning in spiking neural networks by reinforcement of stochastic synaptic transmission." Neuron vol. 40 No. 6 (2003): pp. 1063-1073.

Simulink.RTM. model [online], [Retrieved on Dec. 10, 2013] Retrieved from URL: http://www.mathworks.com/products/simulink/index.html> (2 pgs).
Sinyavskiy, et al. (2010), Generalized Stochatic Spiking Neuron Model and Extended Spike Response Model in Spatial-Temporal Impulse Pattern Detection Task Optical Memory and Neural Networks (Information Optics) 2010 vol. 19 No. 4 pp. 300-309.
Sinyavskiy et al. 'Reinforcement learning of a spiking neural network in the task of control of an agent in a virtual discrete environment' Rus, J. Nonlin. Dyn., 2011, vol. 7, No. 4 (Mobile Robots), pp. 859-875, chapters 1-8 (Russian Article with English Abstract).
Sinyavskiy O.Yu., "Obuchenic s Podkrepleniem Spaikovoy Neiroiniy Seti v Zadache Upravleniya Agentom v Diskretnoy Virtualnoy Srede." Nelineinaya Dinamika, vol. 7 (24), 2011, pp. 859-875.
Sjostrom et al., 'Spike-Timing Dependent Plasticity' Scholarpedia, 5(2):1362 (2010), pp. 1-18.
Steele P.M., et al., "Inhibitory Control of LTP and LTD: Stability of Synapse Strength," Journal of Neurophysiology, 1999, vol. 81 (4), pp. 1559-1566.
Stein. R.B..(1967).Some models of neural variability. Biophys. J.. 7:.37-68.
Stringer, et al., "Invariant Object Recognition in the Visual System with Novel Views of 3D Objects", 2002, 2585-2596, 12 pages.
Supervised learning in Spiking Neural .Networks with ReSuMe Method. Filip Ponulak, Doctoral Dissertation Poznan, Poland 2006.
Sutton R.S. (1988). Learning to predict by the methods of temporal differences. Machine Learning 3(1), 9-44.
SWAT: A Spiking Neural Network Training Algorithm for Classification Problems, Wade, J.J. ; McDaid, L.J. ; Santos, J.A. ; Sayers, H.M., Neural Networks, IEEE Transactions on vol. 21 , Issue: 11 DOI: 10.1109/TNN.2010.2074212 Publication Year: 2010 , pp. 1817-1830.
Swiercz, Waldemar, et al. 'A new synaptic plasticity rule for networks of spiking neurons.' Neural Networks, IEEE Transactions on 17.1 (2006): 94-105.
Szatmary et al., 'Spike-timing Theory of Working Memory' PLoS Computational Biology, vol. 6, Issue 8, Aug. 19, 2010 [retrieved on Dec. 30, 2013J. Retrieved from the Internet: <URL: http://www.ploscomobioi.org/articie/info%3Adoi%2F10.1371%2Fjoumai pcbi.10008 79>.
Tegner J., et al., "An Adaptive Spike-timing-dependent Plasticity Rule" Elsevier Science B.V., 2002.
Thomas S. and Riesenhuber, M, 2004, Realistic Modeling of Simple and Complex Cell Tuning in the HMAX Model, and Implications for Invariant Object Recognition in Cortex, Al Memo 2004-017 Jul. 2004.
Thorpe S.; Ultra-Rapid Scene Categorization with a Wave of Spikes. In H,H. Bulthoff et al. (eds.), Biologically Motivated Computer Vision, Lecture Notes in Computer Science, 2002, 2525, pp. 1-15, Springer-Verlag, Berlin.
Thorpe, S.J., Delorme, A. & VanRullen, R, (2001). Spike-based strategies for rapid processing. Neural Networks 14, pp. 715-725.
Thorpe, S.J., Guyonneau, R., Guilbaud, N Allegraud, J-M, & VanRullen, R. (2004), SpikeNet: real-time visual processing with one spike per neuron. Neurocomputing, 58-60, pp. 857-864.
Timothee Masquelier, "Learning Mechanisms to Account for the Speed, Selectivity and Invariance of Responses in the Visual Cortex", phD thesis published by Universite Toulouse III—Paul Sabatier, U.F.R. Sciences de la Vie et de la Terre, Feb. 15, 2008, pp. 1-192.
Tishby et al., (1999), The information bottleneck method, In Proceedings of the 37th Annual Allerton Conference on Communication, Control and Computing, B Hajek & RS Sreenivas, eds., pp. 368-377, University of Illinois.
Toyoizumi (2007), Optimality Model of Unsupervised Spike-Timing Dependent Plasticity: Synaptic Memory and Weigbt Distribution, Neural Computation, 19 (3).
Toyoizumi et al., (2005), Generalized Bienenstock-Cooper-Munro rule for spiking neurons that maximizes information transmission, Proc. Natl. Acad. Sci. USA, 102, (pp. 5239-5244).

(56) References Cited

OTHER PUBLICATIONS

Van Rullen R,.; Thorpe, S, Rate Coding versus temporal order coding: What the Retinal ganglion cells tell the visual cortex. Neural computation, 2001, 13, 1255-1283.

VanRullen, R, & Koch, C. (2003), Is perception discrete or continuous? Trends in Cognitive Sciences 7(5), pp. 207-213.

VanRullen, R., Guyonneau, R. & Thorpe, S.J. (2005). Spike times make sense. Trends in Neurosciences 28(1).

Vasilaki, et al., "Learning flexible sensori-motor mappings in a complex network" Biol Cybern (2009) 100:147-158.

Vasilaki et al., "Spike-Based Reinforcement Learning in Continuous State and Action Space: When Policy Gradient Methods Fail" PLoS, vol. 5, Issue 12, Dec. 2009.

Visual Navigation with a Neural Network, by Hatsopoulos, Published 1991.

Voutsas, K. ; Adamy, .J., A Biologically Inspired Spiking Neural Network for Sound Source Lateralization Neural Networks, IEEE Transactions on vol. 18, Issue: 6 DOI: 10.11 09/TNN.2007.899623, Publication Year: 2007, pp. 1785-1799.

Wallis, G.; Rolls, E. T. A model of invariant object recognition in the visual system, Progress in Neurobiology. 1997, 51, 167-194.

Wang, R. et al., A programmable axonal propagation delay circuit for time-delay spiking neural networks. Circuits and System (ISCAS), 2011 IEEE International Symposium on. May 15-18, 2011, pp. 869-872 [retrieved on Nov. 13, 2013]. [retrieved from ieeexplore. ieee.org].

Wang 'The time dimension for scene analysis.' Neural Networks, IEEE Transactions on 16.6 (2005): 1401-1426.

Weaver (2001), The Optimal Reward Baseline for Gradient-Based Reinforcement Learning, UA1 01 Proceedings of the 17th Conference in Uncertainty in Artificial Intelligence (pp. 538-545). Morgan Kaufman Publishers.

Weber, C. et al. 'Robot docking with neural vision and reinforcement.' Knowledge-Based Systems vol. 17 No. 2 (2004): pp. 165-172.

Weber et al., (2009), Goal-Directed Feature Learning, In: Proc, International Joint Conference on Neural Networks, 3319 3326.

Wennekers, T., Analysis of Spatia-temporal Patterns in Associative Networks of Spiking Neurons Artificial Neural Networks, 1999. 1CANN 99. Ninth International Conference on (Conf. Publ. No. 470) vol. 1 D01:10.1049/cp:19991116 Publication Year: 1999, vol. 1, pp. 245-250.

Werbos P.J. (1992), or Prokhorov D.V and Wunsch D.C. (1997) Adaptive Critic Designs, IEEE Trans Neural Networks, vol. 8. No. 5, pp. 997-1007.

Werbos P.J., Neurocontrol and Fuzzy Logic: Connections and Designs, International Journal of Approximate Reasoning, 1992, vol. 6 (2), pp: 185-219.

White, D. A., & Sofge, D. A. (Eds.). (1992): Handbook of intelligent control. Neural, fuzzy, and adaptive approaches. Van Nostrand Reinhold-New York.

Widrow B. Hoff. M.E. (1960) Adaptive Switching Circuits, IRE WESCON Convention Record 4: 96-104.

Widrow, Bernard, Narendra K. Gupta, and Sidhartha Maitra. "Punish/reward: Learning with a critic in adaptive threshold systems." Systems, Man and Cybernetics, IEEE Transactions on 5 (1973): 455-465.

Williams (1992), Simple Statistical Gradient-Following Algorithms for Connectionist Reinforcement Learning, Machine Learning 8, 229-256.

Wiskott, et al., "Slow Feature Analysis", 2002, 29 pages.

Wiskott, L.; Sejnowski, T.J. Slow feature analysis: Unsupervised learning of invariances, Neural Computation, 2002, 14, (4), 715-770.

Wohns R.N.W., et al., Day Surgery for Anterior Cervical Microdiskectomy: Experience with 75 Cases, Jul. 11, 2002, pp. 1-3.

Wu, QingXiang, et al. 'Remembering Key Features of Visual Images based on Spike Timing Dependent Plasticity of Spiking Neurons.' Image and Signal Processing, 2009. CISP'09. 2nd International Congress on. IEEE, 2009.

Wysoski et al, "Fast and Adaptive Network of Spiking Neuron for Multi-view Visual Pattern Recognition", May 3, 2008, Elsevier,Neurocomputing vol. 71, pp. 2563-2575.

Xiaohui Xie and H. Sebastian Seung, "Learning in neural networks by reinforcement of irregular spiking", Physical Review E. vol. 69, letter 041909, 2004, pp. 1-10.

Yang Z., et al., "A Neuromorphic Depth-from-motion Vision Model with STDP Adaptation," IEEE Transactions on Neural Networks, 2006, vol. 17 (2), pp. 482-495.

Yi (2009), Stochastic search using the natural gradient, ICML '09 Proceedings of the 26th Annual International Conference on Machine Learning. New York, NY, USA.

Zarandy et al. "Bi-i: A Standalone Ultra High Speed Cellular Vision System." In: [online]. Dated Jun. 13, 2005 (Jun. 13, 2005). Retrieved on Aug. 16, 2012 (Aug. 16, 2012). Retrieved from the Internet at URL:http://ieeexplore. ieee.orgixplilogin.jsp?tp=tarnumber=14387388turl=http/03A%2Fieeexplore.ieee.org %2Fxpls%2Fabs_all.jsp%Farnumber%3D1438738<http: login.jsp?tp="&amumber=1438738&url=http/03A%2F/02Fiee">Alt/http:&a.

Zhou, Computation of Optical Flow Usinga Neural Network, Published 1988.

\* cited by examiner

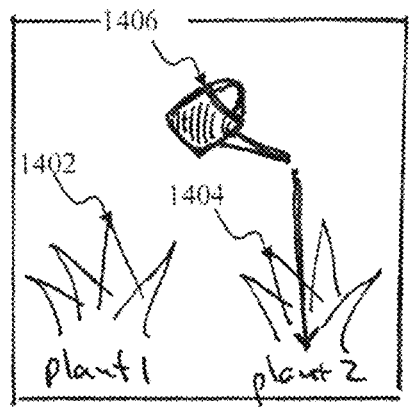
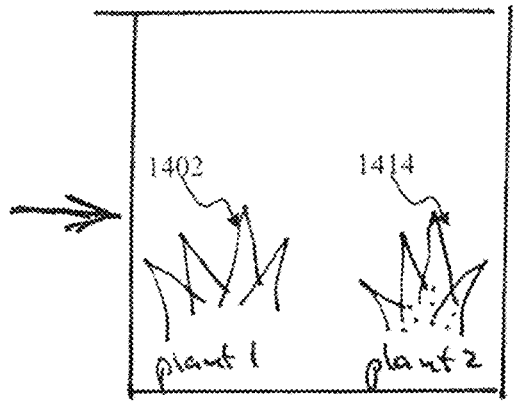
FIG. 14A
FIG. 14B
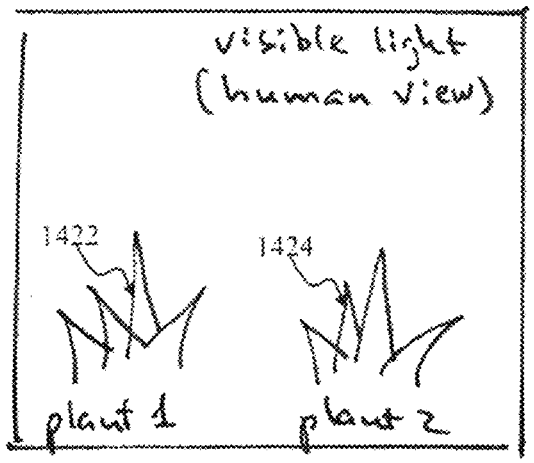
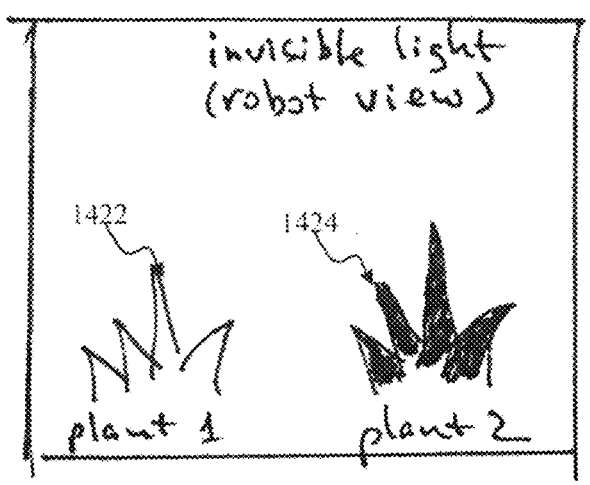
FIG. 14C
FIG. 14D

APPARATUS AND METHODS FOR COMPUTERIZED OBJECT IDENTIFICATION

PRIORITY

This application is a continuation of U.S. Utility patent application Ser. No. 14/923,204, filed on Oct. 26, 2015, which claims priority to and the benefit of U.S. Provisional Patent Application Ser. No. 62/068,166, filed on Oct. 24, 2014, the disclosures of which are incorporated herein by reference in their entireties.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

Technological Field

The present disclosure relates to computer vision and identification of objects by robotic devices.

Background

Object detection and/or identification may be utilized in a variety of applications such as navigation, surveillance, retail, agriculture, public event infrastructure, and or other applications. While some solutions may exist for the identity of patterns (e.g., QR code) they may be often visually glaring and/or offensive to people because they add visual clutter to a scene, and/or reveal objects being marked thereby potentially exposing presence of a security and/or its operational characteristics. Here we propose methods and apparatus may provide for less visible means for marking and/or identifying objects by robotic devices.

SUMMARY

A method of detecting an object by a computerized imaging apparatus is disclosed. In one embodiment, the method comprise: observing an object, wherein the object comprises a pattern; sensing at least a portion of the pattern on the object; and identifying the object based on the sensed at least portion of the pattern; wherein the pattern comprises at least one medium that is undetectable via wavelengths that are visible to a human eye but detectable by the computerized imaging apparatus.

In one variant, sensing the pattern comprises sensing a first medium that is absorbent at a given wavelength range outside a given human-visible spectral range, and a second medium that is less absorbent in the given spectral range relative to the first medium. In a second variant, the first medium and the second medium comprise fiber threads woven into a textile of the object. In a third variant, the first medium and the second medium comprise material that was printed onto the object by a 3-D printing process.

In some cases, sensing the pattern comprises sensing a spectrum of metameric coloration.

In other cases, sensing the pattern comprises sensing a polarized composition of reflected light. For example, in one such case, responsive to an electro-optical device changing a composition of the polarized composition of reflected light, identifying the changed composition of the polarized reflected light.

In still other embodiments, sensing the pattern on the object comprises sensing a given wavelength range that comprises an infrared or an ultraviolet portion.

An article of manufacture is disclosed. In one embodiment, the article of manufacture includes: a first thread type characterized by a first optical property and a second thread type characterized by a second optical property, the threads of the first type and the second type combined into a pattern on a textile fabric forming at least a portion of the article of manufacture. In one such exemplary embodiment, the first optical property and the second optical property are indistinguishable by a human eye; and the first optical property and the second optical property are selected to be distinguishable by an imaging sensor.

In one variant, the first optical property is distinguishable from the second optical property by the imaging sensor based on one or more of light reflectance, wavelength, or polarization.

In a second variant, the pattern comprises one or more geometric shapes.

In a third variant, the pattern further comprises a portion that is visible to the human eye.

A method of tracking a person by a robotic apparatus is disclosed. In one embodiment, the method includes: acquiring a representation of the person at a distance; identifying a characteristic of a pattern disposed on the representation of the person; and adjusting a trajectory of the apparatus so as to maintain a range to the person within a target range. In one exemplary embodiment, the method further includes: detecting a signal at a wavelength invisible to a human; and the pattern comprises one or more elements that are configured to reflect the signal at the wavelength.

In one variant, the signal comprises light reflected from a garment of the human.

In a second variant, the signal comprises light generated from a special illuminant.

In a third variant, the method includes identifying the characteristic comprises identifying one or more geometric shapes of the pattern.

A system configured to detect an object is disclosed. In one embodiment, the system includes: a data structure that associates at least the object with a marking in a first spectral range that is unobservable by a human eye; a computerized imaging apparatus comprising a detector configured to receive one or more spectral components, the detector comprising a filter configured to block or reduce a second spectral range that is in a visible portion of the spectrum, the second spectral range being in one or more polarizations; and responsive to receiving a spectral component in the first spectral range, the computer imaging apparatus is configured to identify the object.

In one variant, the computerized imaging apparatus further comprises an illuminant configured to generate light that comprises at least the first spectral range.

In a second variant, the computerized imaging apparatus further comprises a fixture configured to mark the object with the marking.

In a third variant, the computerized imaging apparatus is further configured to detect changes in the marking.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 14A is a graphical illustration depicting application of an expression agent to a living plant to enable subsequent identification by a computerized imaging apparatus, in accordance with one or more implementations.

FIG. 14B is a graphical illustration depicting absorption of the agent by the plant and expression of a characteristic by the plant, in accordance with one or more implementations.

FIG. 14C is a graphical illustration depicting appearance to a human observer of an unmarked plant and a plant with expressed characteristic, in accordance with one or more implementations.

FIG. 14D is graphical illustration depicting detection by a computerized imaging apparatus of the expressed characteristic of the plant, in accordance with one or more implementations.

Figure 1A:
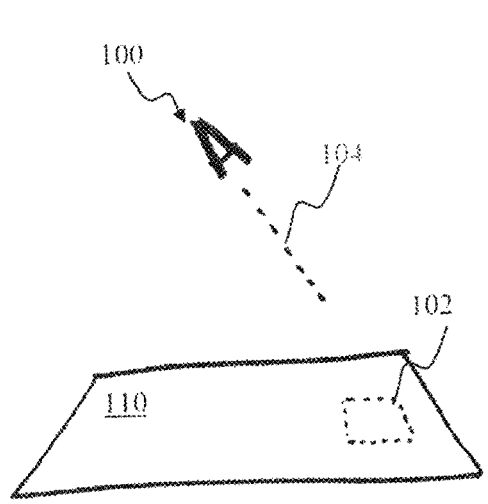
FIG. 1A is a graphical illustration depicting viewing of a pattern on a surface by a human eye, according to one or more implementations.

All Figures disclosed herein are © Copyright 2015 Brain Corporation. All rights reserved.

DETAILED DESCRIPTION

Implementations of the present technology will now be described in detail with reference to the drawings, which are provided as illustrative examples so as to enable those skilled in the art to practice the technology. Notably, the figures and examples below are not meant to limit the scope of the present disclosure to a single implementation or implementation, but other implementations and implementations are possible by way of interchange of or combination with some or all of the described or illustrated elements. Wherever convenient, the same reference numbers will be used throughout the drawings to refer to same or like parts.

Where certain elements of these implementations can be partially or fully implemented using known components, only those portions of such known components that are necessary for an understanding of the present invention will be described, and detailed descriptions of other portions of such known components will be omitted so as not to obscure the disclosure.

In the present specification, an implementation showing a singular component should not be considered limiting; rather, the invention is intended to encompass other implementations including a plurality of the same component, and vice-versa, unless explicitly stated otherwise herein.

Further, the present disclosure encompasses present and future known equivalents to the components referred to herein by way of illustration.

As used herein, the term "bus" is meant generally to denote all types of interconnection or communication architecture that is used to access the synaptic and neuron memory. The "bus" may be optical, wireless, infrared, and/or another type of communication medium. The exact topology of the bus could be for example standard "bus", hierarchical bus, network-on-chip, address-event-representation (AER) connection, and/or other type of communication topology used for accessing, e.g., different memories in a pulse-based system.

As used herein, the term "camera" refers without limitation or estoppel to any imaging device or sensor configured to capture, record, and/or convey still and/or video imagery, which may be sensitive to visible parts of the electromagnetic spectrum and/or invisible parts of the electromagnetic spectrum (e.g., infrared, ultraviolet, and/or other wavelengths that are not perceptible to humans).

As used herein, the terms "computer", "computing device", and "computerized device" may include one or more of personal computers (PCs) and/or minicomputers (e.g., desktop, laptop, and/or other PCs), mainframe computers, workstations, servers, personal digital assistants (PDAs), handheld computers, embedded computers, programmable logic devices, personal communicators, tablet computers, portable navigation aids, J2ME equipped devices, cellular telephones, smart phones, personal integrated communication and/or entertainment devices, and/or any other device capable of executing a set of instructions and processing an incoming data signal.

As used herein, the term "computer program" or "software" may include any sequence of human and/or machine cognizable steps which perform a function. Such program may be rendered in a programming language and/or environment including one or more of C/C++, C#, Fortran, COBOL, MATLAB™, PASCAL, Python, assembly language, markup languages (e.g., HTML, SGML, XML, VoXML), object-oriented environments (e.g., Common Object Request Broker Architecture (CORBA)), Java™ (e.g., J2ME, Java Beans), Binary Runtime Environment (e.g., BREW), and/or other programming languages and/or environments.

As used herein, the terms "connection", "link", "transmission channel", "delay line", "wireless" may include a causal link between any two or more entities (whether physical or logical/virtual), which may enable information exchange between the entities.

As used herein, the term "memory" may include an integrated circuit and/or other storage device adapted for storing digital data. By way of non-limiting example, memory may include one or more of ROM, PROM, EEPROM, DRAM, Mobile DRAM, SDRAM, DDR/2 SDRAM, EDO/FPMS, RLDRAM, SRAM, "flash" memory (e.g., NAND/NOR), memristor memory, PSRAM, and/or other types of memory.

As used herein, the terms "integrated circuit", "chip", and "IC" are meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), application-specific integrated circuits (ASICs), and/or other types of integrated circuits.

As used herein, the terms "microprocessor" and "digital processor" are meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die, or distributed across multiple components.

As used herein, the term "network interface" refers to any signal, data, and/or software interface with a component, network, and/or process. By way of non-limiting example, a network interface may include one or more of FireWire (e.g., FW400, FW800, etc.), USB (e.g., USB2), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11), WiMAX (802.16), PAN (e.g., 802.15), cellular (e.g., 3G, LTE/LTE-A/TD-LTE, GSM, etc.), IrDA families, and/or other network interfaces.

As used herein, the term "paint" refers without limitation or estoppel to one or more pigment(s), dye(s), colorant(s), film(s), layer(s), and/or any other medium, material, and/or element that alters absorption, transmission, refraction, and/or reflection of electromagnetic radiation when placed, sprayed, deposited, mixed, dissolved, added, applied, and/or otherwise disposed on or integrated with a material surface.

As used herein, the term "robot" refers without limitation or estoppel to an device, vehicle, computer, AI agent, surveillance system or device, control system or device, and/or other computerized device capable of autonomous, semi-autonomous, or controlled operation.

As used herein, the term "Wi-Fi" includes one or more of IEEE-Std. 802.11, variants of IEEE-Std. 802.11, standards related to IEEE-Std. 802.11 (e.g., 802.11 a/b/g/n/s/v), and/or other wireless standards.

As used herein, the term "wireless" means any wireless signal, data, communication, and/or other wireless interface. By way of non-limiting example, a wireless interface may include one or more of Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, LTE/LTE-A/TD-LTE, analog cellular, CDPD, satellite systems, millimeter wave or microwave systems, acoustic, infrared (i.e., IrDA), and/or other wireless interfaces.

A pattern and/or demarcation may be applied to indicate the identity of an object and/or surface, and/or their relative position of the pattern to a viewer. A viewer may be an imaging system comprising a processor in communication with one or more of a laser scanner, a camera, a moving photodiode, and/or other components. While some solutions may exist for identifying patterns (e.g., QR code) they may be often visually glaring and may be offensive to people because they add visual clutter to a scene. Exemplary implementations include methods capable of generating patterns with one or both of: (1) sufficient structure to be used for either discrimination, or some aspect of localization, and/or (2) spectral properties that are more aesthetically acceptable (e.g., imperceptible or subtle to the human observer and/or aligned to an existing acceptable visual form, such as a logo).

In some implementations, methods of generating spectral patterns that may not be detectable by humans (and/or appear subtle to humans) are disclosed.

In some implementations, active targets may be provided using electro-sensitive films or liquid crystal films to change any of the active target's aforementioned optic properties dynamically. In some variants, active targets can display different information according to their input signals (similar to the manner in which an LCD display operates). Certain implementations may be optimized for thinness, flexibility, and/or degree of perceptibility with the human eye).

One or more implementations disclosed herein may work in daylight or artificial light, and may not require a special illuminant. Some implementations may involve special-illuminant approaches such as fluorescence targets, x-ray absorption targets, and/or other approaches. In some implementations, targets may be configured for use with polarized light. By way of an illustration, quarter wave plates for a given visible wavelength may become apparent in polarized light.

In some variants, a quick response (QR) code may be utilized with the methodology described herein. In some implementations, the QR code may be configured based on a modification of light polarization that may be reflected from the surface of the code area. For example, a known pattern may be utilized (e.g., a checkerboard patch and/or one or more square bull's eyes) that are specifically designed to aid in QR code detection, alignment, and recognition of encoding standard.

In some implementations, various methods may be employed for pattern detection, e.g., optical tracking and alignment, blob tracking, de-warping, similarity maximization, and/or other methods. In one or more implementations of machine learning, one or more of unsupervised machine learning (clustering, greedy feature extraction, recurrent networks) and/or supervised machine learning (multilayer perceptron, working memory, nearest neighbor classifier) algorithms may be employed.

In one or more implementations, an ultraviolet (UV) absorbent paint may be used for identifying a target using a transmitted-light. The term target may be used to describe a QR code, a bull's-eye pattern, an item identification (ID), e.g., a serial number, a pennant number, and/or other characteristic.

A substance transparent to the visible light but absorbing near-UV light may form a good transmission target when a volume-applied, layer-applied, and/or surface-applied treatment of the substance is disposed on a transparent material such as glass, acrylic, polycarbonate, polyethylene, mica, and/or other transparent material.

In one or more implementations, an UV absorbent material may be used for identifying a target using reflected-light. A substance highly reflective to the visible light (e.g., white) but absorbing near-UV light may form a high contrast reflection target when applied. A transmitted-light target may be converted to a reflected-light target when a reflective layer is placed under it.

In some implementations, a combination of absorption and thin-film target approaches may be utilized. For example, a layer scattering visible light and absorbing UV may be over imposed on a layer that selectively reflects UV light at certain wavelengths.

In one or more implementations, a 3D printed object may be composed of two plastics that appear to be the same color, but have differing absorbance outside the visible spectrum (e.g., one absorbs UV light, and the other reflects it.) The deposition of the plastics into solid forms may be in accordance with a digitally defined policy that allows the surface marking to display a 2D pattern.

In one or more implementations, surface reflectance properties of an object may be used for embedding a code. For example, this may be done with a coating, by changing the material itself, by texturizing the material (e.g., glossy vs matte), and/or other approaches.

In some implementations, threads of fabric or composite (e.g., an in-weave in carbon fiber) may be dyed (e.g., UV absorptive) and/or coated (e.g., changing the diffraction of incident light) with a pigment, polymer, and/or paint. The combination of two or more different threads, or a treated thread upon an untreated background fabric, e.g., utilizing a Jacquard weaving technique or similar method, may allow for the creation of a 2D pattern prior to, during, and/or after the manufacturing of clothing, rugs, sheets, carpets, upholstery, and/or other fabrics. In one implementation, a series of circular dots are arranged on a hexagonal grid, such that the spacing between each dot is a fixed distance, allowing an external imaging system to more accurately assess the distance to the proximal surface of the object.

An imaging apparatus outfitted with an appropriately polarized filter may be used to detect the pattern. Other physical patterns may be used for augmented reality, unique identification, back projection, and/or other applications.

In one or more implementations, dichroic filters and/or thin-film optics may be utilized for target identification. By way of an illustration, a thin-layered target will reflect and transmit different wavelengths differently.

In some implementations, a pressurized spray container and/or other spraying device may deposit a substance (e.g., UV absorptive or UV reflective pigment) in a predetermined pattern (e.g., with the assistance of a stencil). The pigment may be invisible to the human eye, and thus may coat any surface to achieve the desired demarcation in the non-visual spectrum. In some implementations, two or more spray containers may be metameric and/or nearly metameric (i.e., both appear to be the same or similar to the human eye, e.g., RED 1 and RED 2). The containers may activate the same ratio of cone cells (S, M, and L) during transduction, but the albedo of natural light may differ, providing a signature between the two different reds, accessible by the right spectral filter. Such a filter may be designed or selected such that it discriminates between the two reds. Those skilled in the art will appreciate that the spectral absorption and reflection properties of the two sprayed substances (e.g., paints, pigments, dyes, and/or coatings) may be chosen so that they would look the same to the human eye under one light source but not under another (e.g., sunlight vs. tungsten light); and/or that the intensity of reflection from the two paints would inform a robot as to the ambient lighting conditions.

In some implementations, a water-insoluble marker (e.g., a chalk) and/or a water-soluble marker (e.g., a fertilizer) may be deposited on the ground. Fertilizer or other water-soluble substances may be taken up by the plants, selectively (by some plants) or non-selectively (by all plants in the treated area), altering their optical properties outside the human visible range and making them look different to a robot (e.g., for weeding or other agricultural purposes). A chalk, paint, spray, and/or other material may be used to mark plants, plant parts, and/or plant locations (e.g., mark the ground next to the plant) so that the difference between the marked and unmarked plants would be clearly visible to a robot, but invisible or inconspicuous to the human eye. In some implementations, special care may be taken to ensure that the materials used comply with organic and/or other specifications pertinent to the commercial and/or other plant growing procedures. In some implementations, special care may be taken to ensure that the materials used do not interfere in undesired manner with the vital processes of the plants and/or other organisms in the vicinity.

In some implementations, an organism (e.g., a plant, animal, and/or other organism) may be genetically and/or epigenetically modified to express and/or to suppress expression of novel, modified, and/or unmodified substance (e.g., pigment, opsin, and/or other substance) so that the entire organism and/or some parts thereof would appear different to a robot (e.g., outside the visible spectrum) yet similar or identical to a human eye, compared to an unmodified organism.

In some implementations, a silk screen, laser print, ink jet print, lithographic process, and/or other technique for applying material to surfaces may result in the generation of the desired patterned marking.

In some implementations, the electrical signal of a rasterized scan (e.g., for a CRT, LCD, LED, liquid crystal, eInk, mirasol, DLP, and/or other display technology), may result in the activation of pixels with spectral emissions that are the same in the visible range, but differ outside of the visible range.

Those skilled in the art will appreciate that the effects described above may be achieved not only by means of dyes or pigments that alter absorption and/or transmission and/or reflection of light, but also by (but not limited to) one or more of the following means: (1) thin-film, dichroic, interference, birefringent, and/or other linear or nonlinear optical components and/or coatings; (2) surfaces, coatings, and/or elements (e.g., quarter-wave plates) that may alter polarization of the transmitted and/or reflected light; (3) liquid-crystal devices; and/or (4) other means (e.g., electro- or chemo-sensitive) that may change their properties according to an external signal and/or ambient conditions, so that the invisible and/or inconspicuous pattern may change dynamically according to external input and/or ambient conditions.

Those skilled in the art will appreciate that additional information may be extracted from the optical properties of such markings outside the visible spectrum. For example, angle of view may be determined from the cutoff wavelength of a dichroic filter.

Various patterns may be utilized with the object tagging methodology described herein. Non-limiting examples of such patterns may include patterns of one or more of dots, stripes, squares, polygons, fractal patterns, barcodes and/or other algorithmically generated code and identification systems, combinations of patterns reflecting visible light and invisible electromagnetic waves, visible pattern and invisible metadata, invisible detection points, visible pattern identity, and/or other patterns.

In some implementations, pattern detection may include one or more of: (1) detection of a code (e.g., orange lump with some invisible spectral variation), (2) identification of features (e.g., location of circle centers in image plane), (3) processing of feature relationships (e.g., distances between particular points), (4) extraction of knowledge (identity of marker, depth, orientation or location), and/or other actions.

In some implementations, the following approaches may be employed for providing invisible and/or nearly imperceptible machine detectable patterns: (1) the use of polarized light; (2) the use of color metamers (e.g., colors which are substantially identical within the visible spectra of wavelength (human cone cells activate in substantially the same manner for a color and its metamers), but incorporate additional spectral components that are invisible or very subtle to humans); (3) the use of colors that are "close" in human perception, but very easy for a matching spectral notch filter to discriminate; (4) the use of different reflectance properties (e.g., glossy black vs matte black that is easy to detect with any reflected back projection, or infrared flash, but which may be subtle to the human eye); (5) the use of difference images for two different filtered cameras that can isolate the particular tags, and cancel out other patterns (e.g., useful in high signal to noise applications, based on the filter); and/or other approaches.

In some implementations, specific parameters of spectral energy emission may be used to provide the invisible codes.

In one or more implementations, the methodology described herein may be utilized for one or more of: (1) Tracking a marked object, (2) Identifying a marked object or class of marked objects, (3) Distinguishing between differently marked objects, (4) Keeping constant distance from a marked object, (5) Providing a teaching stimulus to a robot, (6) Providing object-related information to a robot, (7) Providing navigational information to a robot, (8) Providing a command to a robot (e.g., by changing, exposing, or obscuring the pattern), (9) Triggering an action or camera when a particular pattern or object is seen, (10) Triggering an action or camera when a particular pattern or object is seen in a particular range of parameters (e.g., distance, viewing angle, speed of motion, ambient conditions, and/or other parameters), and/or other applications.

FIG. 1A illustrates an example of a simple pattern 102 on a surface 110. The pattern 102 may comprise markings that may not be visible to a human eye 100. The pattern 102 may be an optically invisible marker (e.g., dyed), part of an aesthetic visual form on the surface 110, a pigment that is metameric with the surface, etc., as described supra.

Figure 1B:
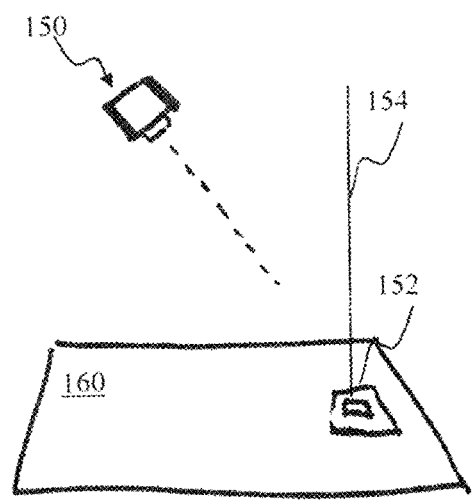
FIG. 1B is a graphical illustration depicting viewing of a pattern on a surface by an imaging apparatus, according to one or more implementations.

Such a pattern may be distinguished by a non-human viewer. FIG. 1B illustrates detection of the pattern of FIG. 1A by an imaging sensor 150 characterized by a sensitivity enabling the sensor to detect the invisible markings (i.e., marking not visible to the human eye). The pattern 152 is observable by the sensor 150 and may be used as an input for further processing. Additionally shown is a fronto-parallel plane that may comprise a plane perpendicular to an axis that is normal to the plane of the pattern (e.g., the axis denoted by arrow 154 in FIG. 1B that may be perpendicular to the plane 160).

Figure 2:
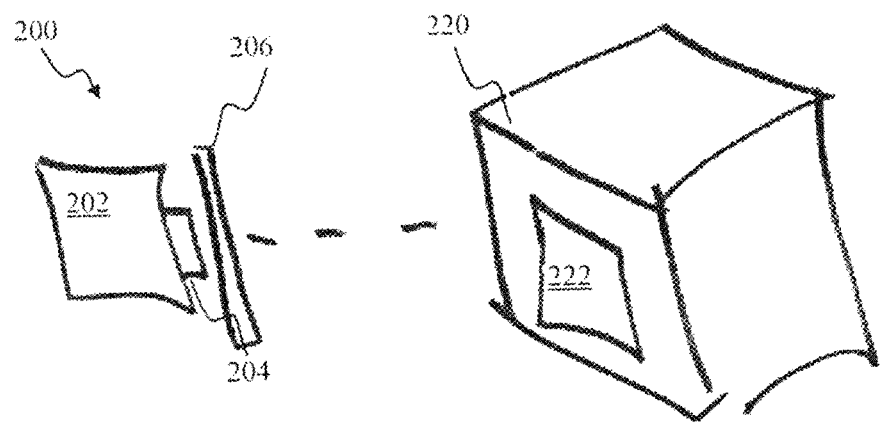
FIG. 2 is a block diagram illustrating an imaging sensor comprising a lens and a selective filter directed at an object surface that contains a code, according to one or more implementations.

FIG. 2 illustrates another example of a distinguishable pattern detectable by a machine or apparatus 200, where an imaging sensor 202 comprising a lens 204 and a selective filter 206 directed at an object surface 220 that contains a code 222, according to one or more implementations. In one implementation, similar to the pattern shown in FIGS. 1A and 1B, the sensor 200 may be configured to detect the code 222 that otherwise may be invisible to humans. The code may be an adhesive, additive paint, and/or printed into the material of the object itself. Other structures, materials and/or mechanisms as described supra may be used exploit the different perceptive capabilities between a human observer and a machine sensor able to distinguish visual or spectral characteristics of the code 222.

Figure 3:
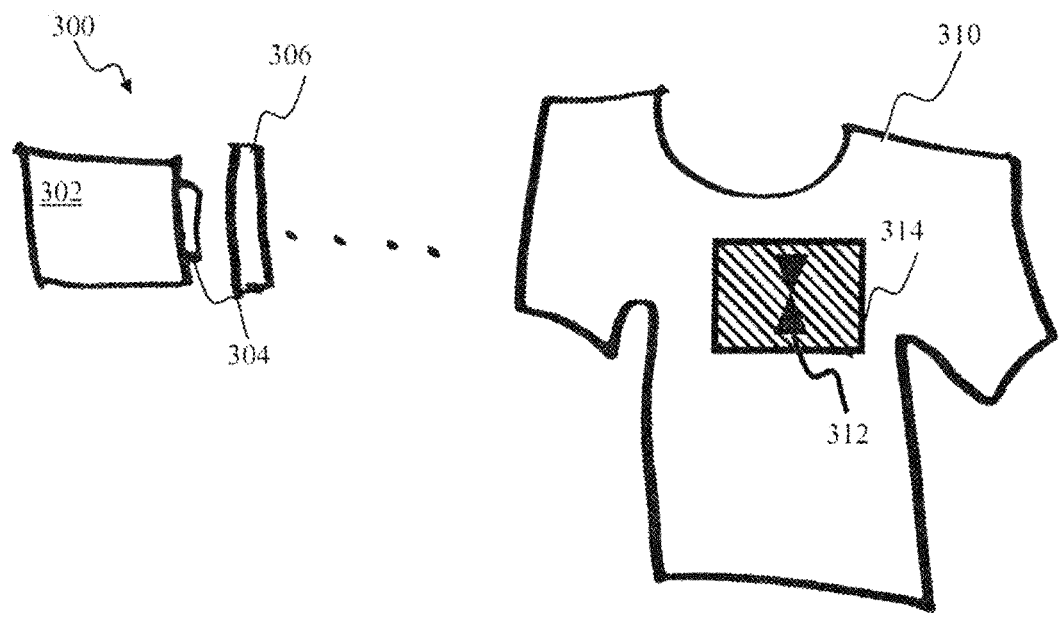
FIG. 3 is a graphical illustration depicting an imaging sensor with a lens and filter that is directed at an article of clothing with a code embedded into the fabric, in accordance with one or more implementations.

FIG. 3 illustrates still another example of a machine observer 300, where an imaging sensor 302 comprising a lens 304 and filter 306 is directed at an article of clothing 310 with a code 312 embedded into the fabric, in accordance with one or more implementations. In one implementation, the code 312 comprises shapes recognizable by the machine 300 (e.g., triangles, rectangles, circles, etc.), and may comprise a sprayed pigmented dye, printed coating, or other substance with a particular absorptive or reflective property. Such a code may be recognizable by the machine observer under an appropriate light source (e.g., UV). Filter 306 may be a spectral filter that may or may not be necessary to for the sensor 302 to recognize the code 312, by virtue of spectral absorption and reflective properties of the filter 306 and/or the material of code 312, as described supra. Elsewhere on the fabric may be a logo or other visible feature 314, where the code 312 may be embedded thereon or implemented so as to be unnoticeable and visually unobtrusive to a human observer.

Figure 4A:
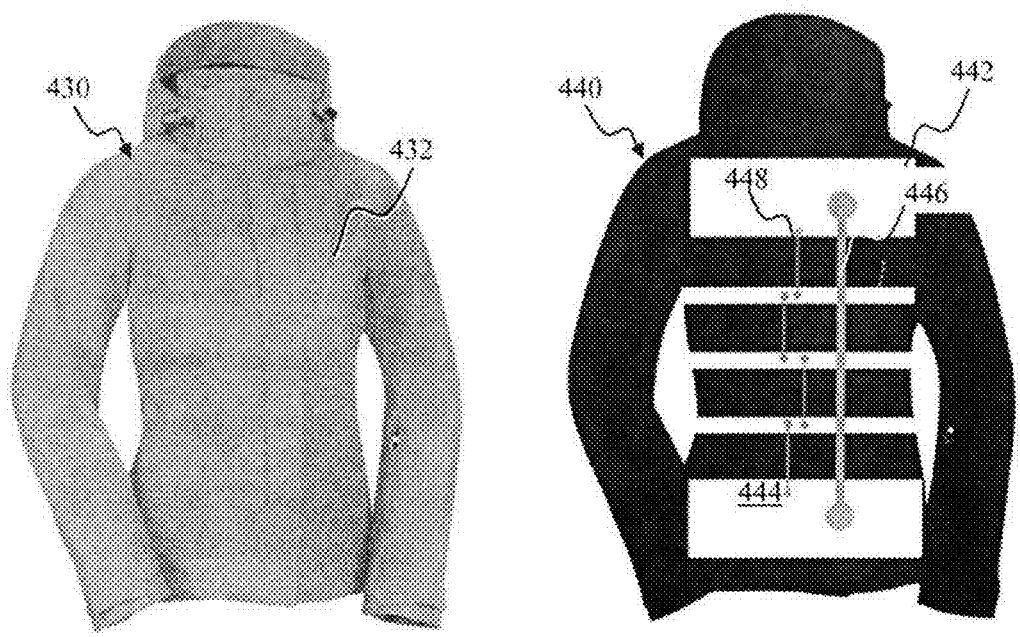
FIG. 4A is a graphical illustration depicting an exemplary item of clothing comprising a pattern of rectangles that is visually unobtrusive while machine detectable, in accordance with one or more implementations.

FIG. 4A is a graphical illustration depicting an item of clothing 430 comprising a pattern 432 that is visually unobtrusive while machine detectable, comprising a plurality of rectangles 446 disposed at a plurality of distances 448 from one another, in accordance with one or more implementations. In one implementation, a machine-detected view of the clothing 440 shows rectangles arranged among blank areas 442, 444. The pattern of rectangles 446, the presence of rectangles, and/or the distances 448 of rectangles may indicate an encoded pattern or signal for the machine detecting the pattern. Other shapes or polygons, e.g., circles (as in FIG. 4C) or triangles, in lieu of rectangles may be recognized by the machine. Such shapes may be formed individually or in a grouped manner, and by various means (e.g., coated, stenciled, dyed) as described supra, and may (to varying degrees and/or camouflaged with other visible features) or may not be perceptible to human observers. Certain spectral properties of material used to form the shapes (e.g., rectangles 446) may be taken advantage of in order to use various surfaces of the clothing 430. For example, shapes formed on both the front and the back may be detected using material that are relatively transparent. That is, material that absorbs and/or reflects non-visible light (e.g., infrared (IR), UV) may be detectable even though it is not in direct line of sight by a machine sensor.

Figure 4B:
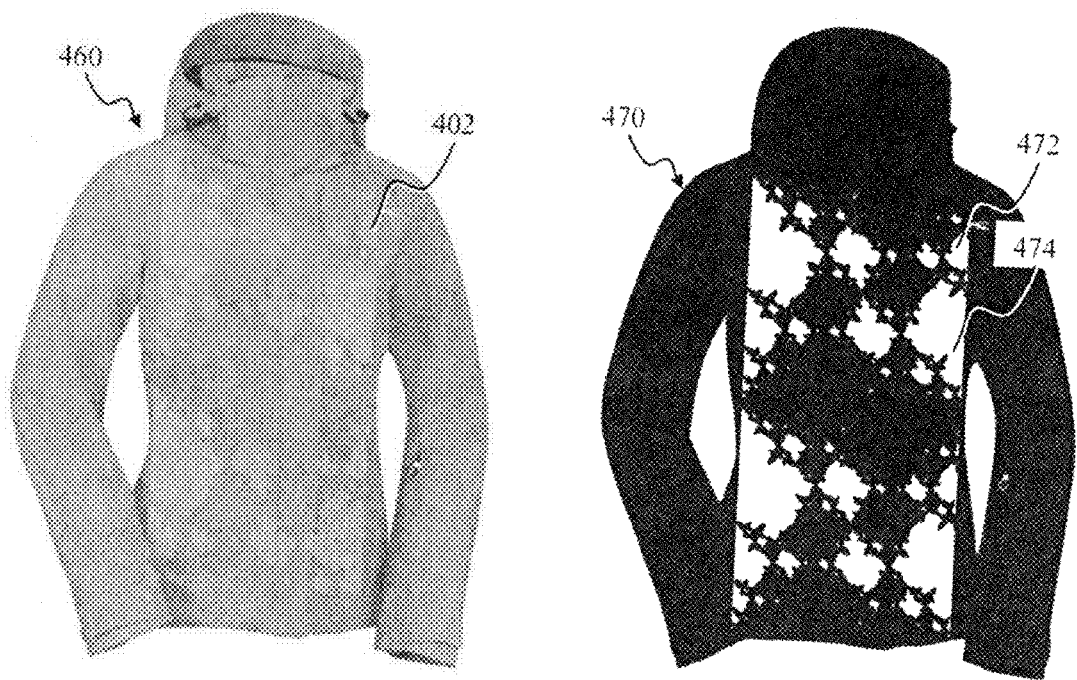
FIG. 4B is a graphical illustration depicting an exemplary item of clothing comprising a pattern of fractals that is visually unobtrusive while machine detectable, in accordance with one or more implementations.

FIG. 4B is a graphical illustration depicting an item of clothing 460 comprising a pattern that is visually unobtrusive while machine detectable, comprising a fractal pattern 402, in accordance with one or more implementations. In one implementation, a machine-detected view of the clothing 470 shows the fractal pattern visible to a machine sensor with distinct areas 472, 474 clearly distinguishable. The pattern to detect may comprise size, fractal level, location, presence, etc., of areas 472, 474. In another implementation, the detectable pattern may be the fractal properties of darkened areas (i.e., other than areas 472, 474). Such a pattern may be formed by various means (e.g., coated, stenciled, dyed) as described supra, and may or may not (to varying degrees and/or camouflaged with other visible features) be perceptible to human observers.

Figure 4C:
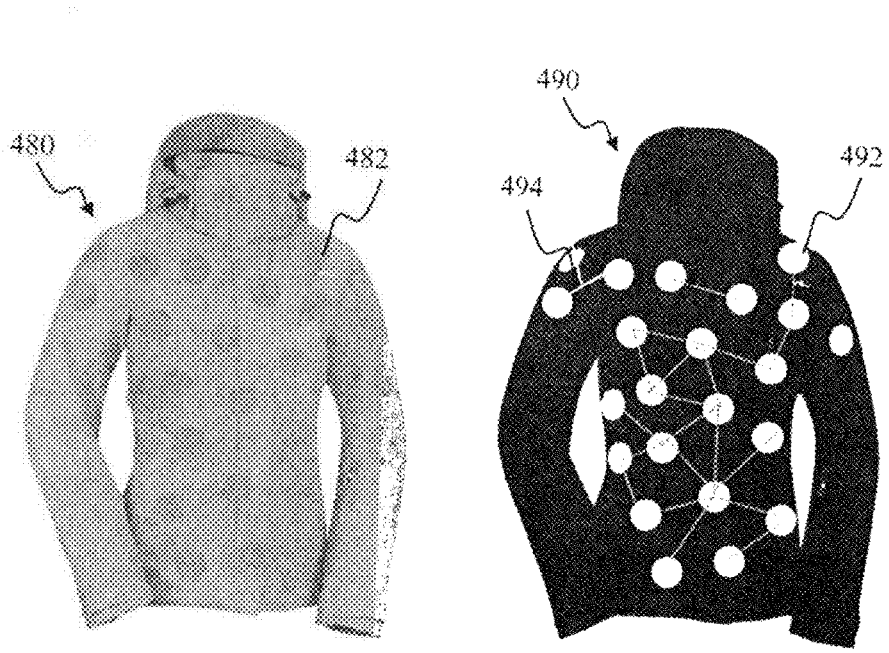
FIG. 4C is a graphical illustration depicting an exemplary item of clothing comprising a pattern of circles that is visually unobtrusive while machine detectable, in accordance with one or more implementations.

FIG. 4C is a graphical illustration depicting an item of clothing 480 comprising pattern that is visually unobtrusive while machine detectable, comprising circles 482 disposed at a plurality of distances 494 from one another, in accordance with one or more implementations. In one implementation, a machine-detected view of the clothing 490 shows a plurality of circles 492 arranged in a pattern. Distances 494 may vary or be constant for some or all of the circles 492. Such shapes and patterns may be formed individually or in a grouped manner, and by various means (e.g., coated, stenciled, dyed) as described supra, and may or may not (to varying degrees and/or camouflaged with other visible features) be perceptible to human observers.

Figure 5:
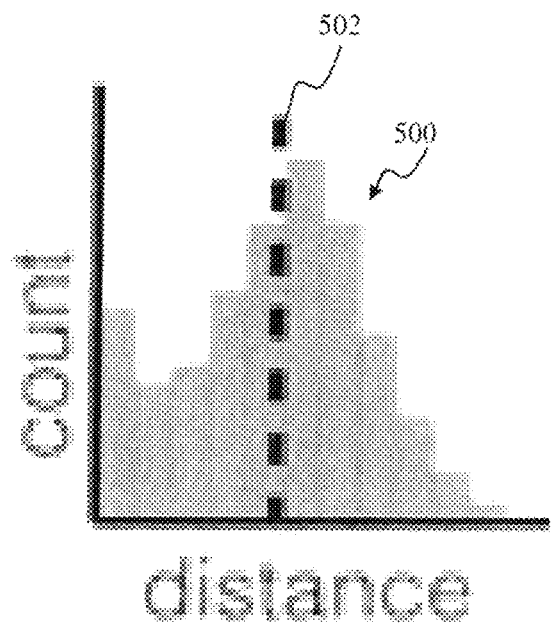
FIG. 5 is a plot depicting distance distribution of pattern elements of, e.g., patterns of FIG. 4A, in accordance with one or more implementations.

FIG. 5 is a plot 500 depicting distance distribution of pattern elements of, e.g., patterns of FIG. 4B or 4C, in accordance with one or more implementations. For example, based on a horizontal or vertical sum of areas 472, 474 in FIG. 4B, a histogram 500 of distance (e.g., from one side of the pattern to the opposite side) plotted against area may be created. As another example, based on a horizontal or vertical sum of areas (or count) of circles 492 in FIG. 4C, a histogram 500 of distance (e.g., from one side of the pattern to the opposite side) plotted against area (or count) may be created. This data may be useful in identifying a visual pattern using a quantitative distribution pattern, determining characteristics of a pattern such as the distance of area-weighted or count-weighted average 502, or simplifying the machine-observed pattern by encoding into a plot. Quantitative data such as plot 500 or a tabular format thereof may be further analyzed or transmitted in a digital format that is more compact than the pattern itself, which may comprise images or degraded versions thereof. In some implementations, the distance may be measured as depth, particularly for patterns detectable from multiple surfaces (using, e.g., IR, UV) as described supra.

In some implementations, pattern identification may be configured based on polarization of light. Reflection of incident light at and/or close to the Brewster angle is strongly polarized even when the incident light (e.g., sunlight) is weakly polarized and/or not polarized at all. A surface of an object (e.g., 152 in FIG. 1B, 222 in FIG. 2, 312 in FIG. 3) may be coated with crystalline material predominantly oriented so that the reflection towards the detecting device (e.g., along a horizontal axis) would be polarized. In one or more implementations, an absorptive and/or a birefringent filter may be used to detect reflected light of a given polarization.

An imaging apparatus, (e.g., 150 in FIG. 1B, 202 in FIG. 2, 302 in FIG. 3) may employ a filter (e.g., 206 in FIG. 2, 306 in FIG. 3). The filter may modify intensity of the polarized portion of the light that may have been reflected from the pattern surface, relative the light portion that may have been reflected from areas outside the pattern surface. The imaging apparatus may comprise a processing component (e.g., 616 in FIG. 6A) configured to determine a difference between intensity (brightness) of pixels in a given image and/or to determine occurrence of a pattern. The pixel intensity variations within the image may be used to detect occurrence of one or more a predetermined patterns (QR code, barcode, pattern of bars or dots, Mandelbrot and/or other fractal set, and/or other patterns).

In some implementations, pattern identification may be configured based on a wavelength characteristic. By way of an illustration, a visually transparent while UV-absorbent spray (for instance such as used to protect works of art from UV radiation and/or Trek? Ray Bloc UV Fabric Protector Spray) may be applied onto an object (e.g., a vehicle, a garment, and/or other) via a stencil. Sprayed portions of the pattern may be characterized by higher UV absorption (lower UV reflectance) than the unsprayed parts, and thus will look darker to the UV-sensitive imaging system.

An imaging apparatus, (e.g., 150 in FIG. 1B, 202 in FIG. 2, 302 in FIG. 3) may employ a filter (e.g., 206 in FIG. 2, 306 in FIG. 3) configured to absorb and/or reflect visible portion of the light spectrum while passing through near-UV radiation. In some implementations, the filter cutoff wavelength may be selected at wavelength between 300 nm and 400 nm (for example a photographic 403 filter). The imaging apparatus may comprise a detector component (e.g., a CMOS/Active pixel sensor) that may be sensitive to a near-UV radiation.

In some implementations, pattern identification may be configured based on a relative reflectance of the pattern components in the invisible part of the spectrum (in the above example—in the near UV).

In some implementations, pattern identification may be configured based on a comparison of outputs provided by two detectors. In some implementations, one detector equipped with a filter and the other without a filter. In some implementations, individual detector component may comprise respective while different filters. A difference image may be obtained by subtracting an image obtained by the first detector component from the image obtained by the second one detector.

Figure 6A:
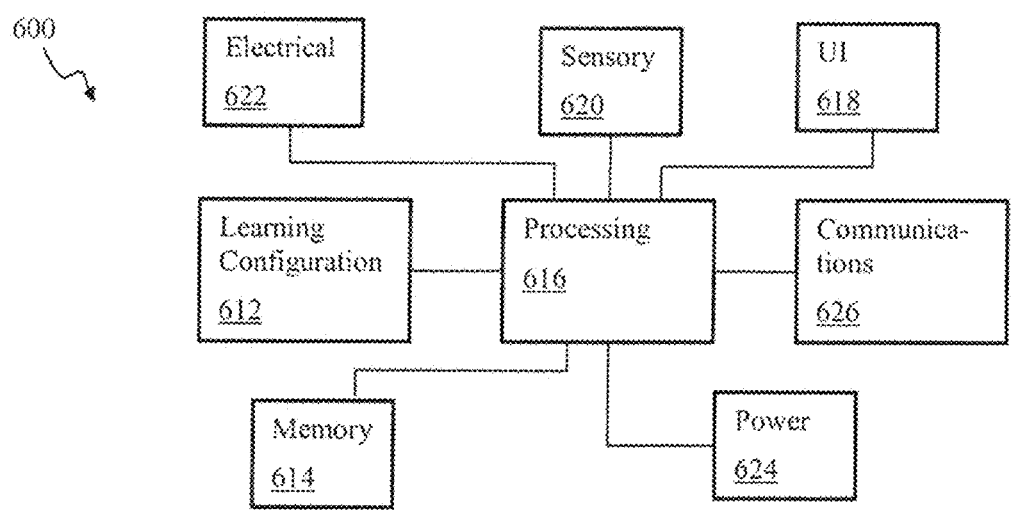
FIG. 6A is a functional block diagram illustrating components of a computerized apparatus configured for use with one or more implementations disclosed herein.

FIG. 6A is a functional block diagram illustrating components of a computerized apparatus 600 configured for use with one or more implementations disclosed herein. The apparatus 600 may include one or more of a learning configuration unit 612, a memory 614, a processing unit 616, a user interface (UI) 618, a sensory unit 620, an electrical unit 622, a power unit 624, a communications unit 626, and/or other components. The learning configuration unit 612 may be configured to facilitated learning by apparatus 600. The memory 614 may be configured to store and/or provide access to information associated with apparatus 600. The processing unit 616 may provide processing capabilities to apparatus 600. The user interface (UI) 618 may be configured to receive information from a user and/or convey information to a user. The sensory unit 620 may be configured to sense an environment surrounding apparatus 600. The electrical unit 622 may be configured to facilitate locomotion of apparatus 600. The power unit 624 may be configured to provide electrical power to one or more components of apparatus 600. The communications unit 626 may be configured to facilitate communication of information to and from apparatus 600.

Figure 6B:
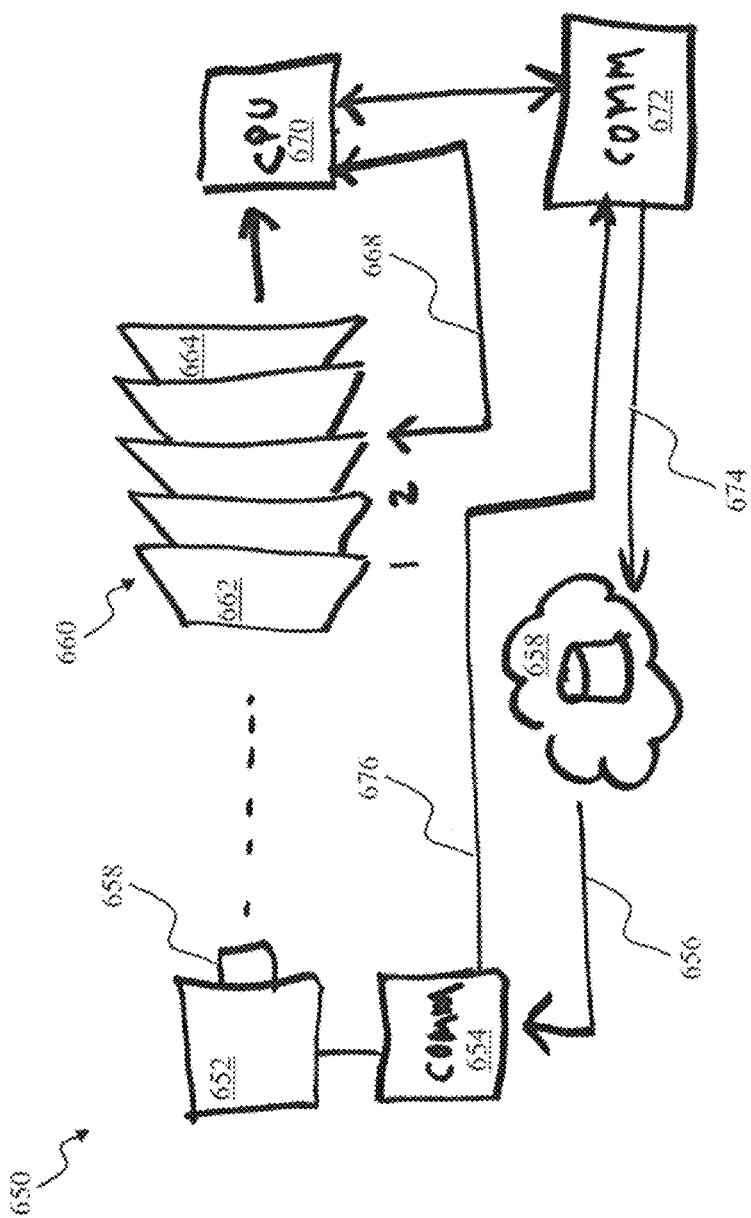
FIG. 6B is a functional block diagram illustrating components of a computerized imaging system configured to detect human non-detectible codes, in accordance with one or more implementations.

FIG. 6B is a functional block diagram illustrating components of a computerized imaging system 650 configured to detect human non-detectible codes via lens 658 of an imaging sensor 652, in accordance with one or more implementations. In one implementation, the imaging system of FIG. 6B may comprise an active display system (e.g., LCD) which may render a new code (e.g., on image 662) based on a sequence of predetermined images 660 (comprising images 662 through 664) and/or based on a communication protocol 676 that may include messages from a communication module 654 connected to the imaging sensor 652. In some implementations, the images are configured to be generated and transmitted to or from at least one CPU 670 (via link 668), which is configured to be in communication with a communication module 672. The CPU may insert or remove or otherwise modify the images 660.

As shown, information associated with the images or patterns 660 (e.g., 662 through 664) may be stored on a remote storage location 658 via path 674 and retrieved by the communication module 654 connected to the imaging sensor 652 via path 656. The direct receipt of information associated with the patterns or images may also be used (via path 672). For example, in some cases, direct information may be useful as control data for use in pattern identification or training to identify patterns based on a comparison of data provided by the communication modules 654, 672 and visually detected by the imaging sensor 652. Training of the imaging sensor 652 (or one or more components thereof, such as the learning configuration unit 612 of FIG. 6A) may be useful in improving, calibrating, or correcting detection sensitivity.

Figure 7:
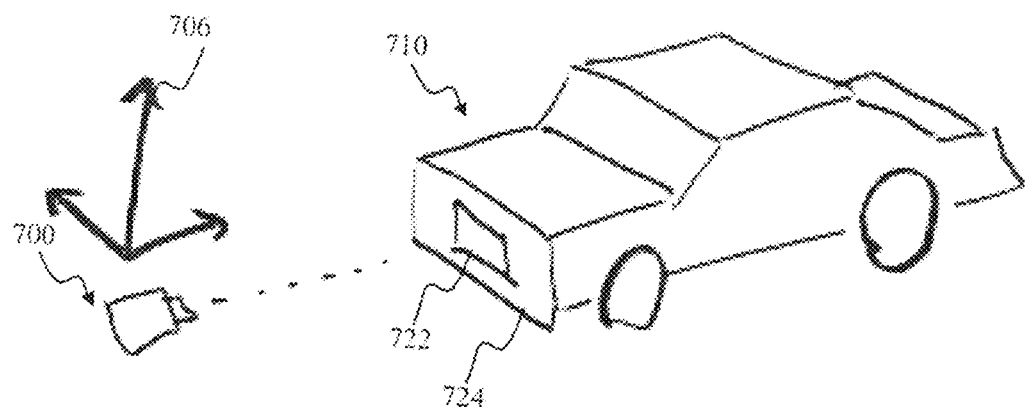
FIG. 7 is a graphical illustration depicting determination of vehicle relative position by an imaging sensor capable of detecting machine detectable code on a surface of vehicle, according to one or more implementations.

FIG. 7 is a graphical illustration depicting determination of a vehicle's 710 relative position by an imaging sensor 700 capable of detecting machine detectable code 722 on a surface 724 of vehicle 710, according to one or more implementations. The imaging sensor 700 of FIG. 7 may be configured to detect a code 722 on a surface of vehicle 724, and/or capable of extracting the relative position 706 of the imaging sensor with respect to the vehicle. The detected pattern 722 may be embedded in the license plate light or brake lights, and/or on the painted surface 724 of the vehicle. The pattern 722 may be chosen such that the estimate of an aspect of the relative position 706 is best measured (e.g., depth vs. translation), potentially optimized for different distances (e.g., detection at large distances, depth estimation at more proximal distances).

Figure 8:
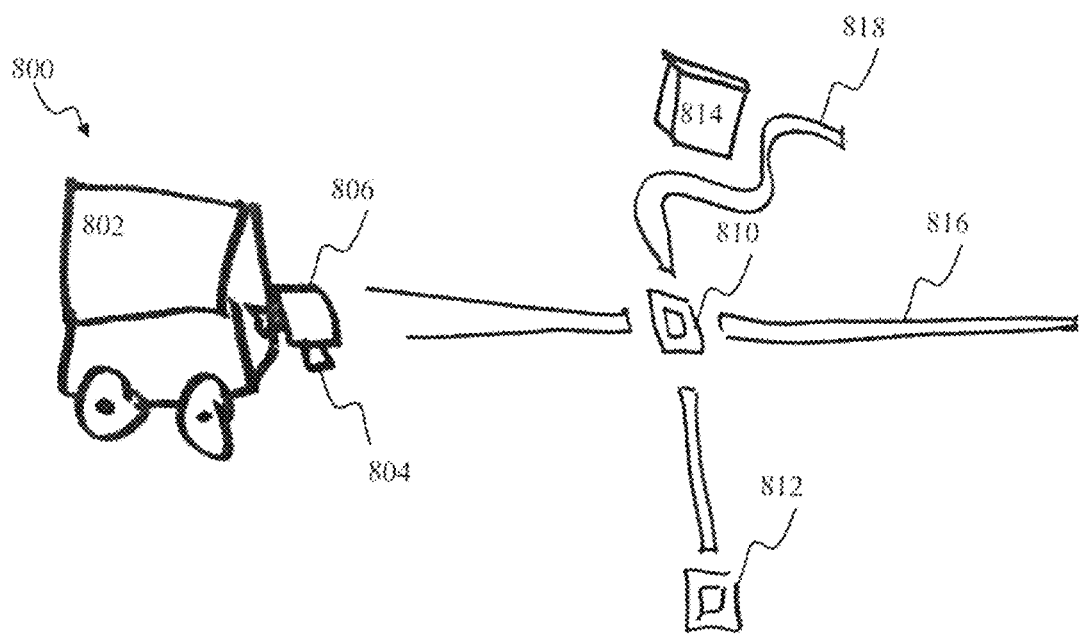
FIG. 8 is a graphical illustration depicting a downward facing imaging apparatus configured to facilitate vehicle navigation, according to one or more implementations.

FIG. 8 is a graphical illustration depicting a downward facing imaging apparatus 800 configured to facilitate vehicle navigation, according to one or more implementations. In one implementation, the imaging apparatus 800 comprises a vehicle 802 having a lens 804 attached to an imaging sensor 806. The imaging apparatus 800 may be capable of navigating roads, terrain, or predetermined paths. A pattern of markings may be used to indicate navigational paths 816, 818, waypoints 810, 812, and/or potential actions. Waypoints 810, 812 may exist preceding and/or within intersections to facilitate anticipation and execution of turns. Waypoints 810, 812 may comprise markings on the ground or other locations (e.g., signs, billboards, buildings) that are visible only to the imaging sensor 806 to facilitate navigation and/or potential actions of the vehicle 802. Such markings may also be visible to human viewers and/or may be camouflaged within surrounding unobtrusive markings. Paths 818 may be curved so as to facilitate the navigation around obstacles 814. Paths on ground may be passively marked and/or actively controlled.

Figure 9A:
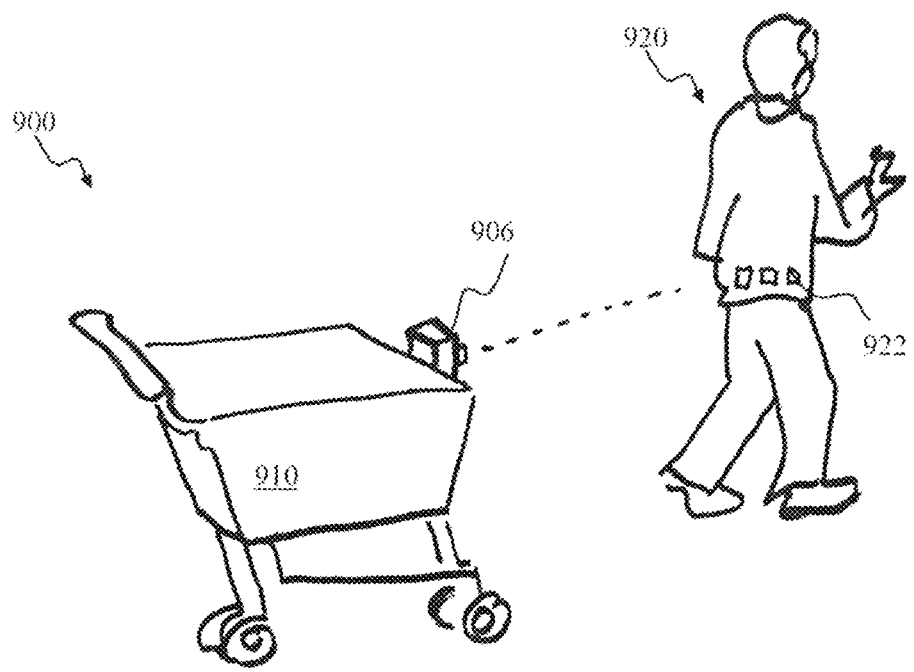
FIG. 9A is a graphical illustration depicting an imaging apparatus disposed on a cart and configured to enable cart navigation by tracking an invisible code disposed on a person, in accordance with one or more implementations.

FIG. 9A is a graphical illustration depicting an imaging apparatus 900 disposed on a cart 910 and configured to enable cart navigation by tracking an invisible code 922 disposed on a person 920, in accordance with one or more implementations. The code 922 may comprise a pattern disposed on a belt and/or on the external surface of the clothing, detectable by an imaging sensor 906 associated with the cart 910. In some implementations, the code pattern 922 may be part of a design on belt and/or the external surface of the clothing worn by the person 920, such that the code pattern 922 is aesthetically unobtrusive to human viewers but machine detectable, such as with the imaging apparatus 900.

Figure 9B:
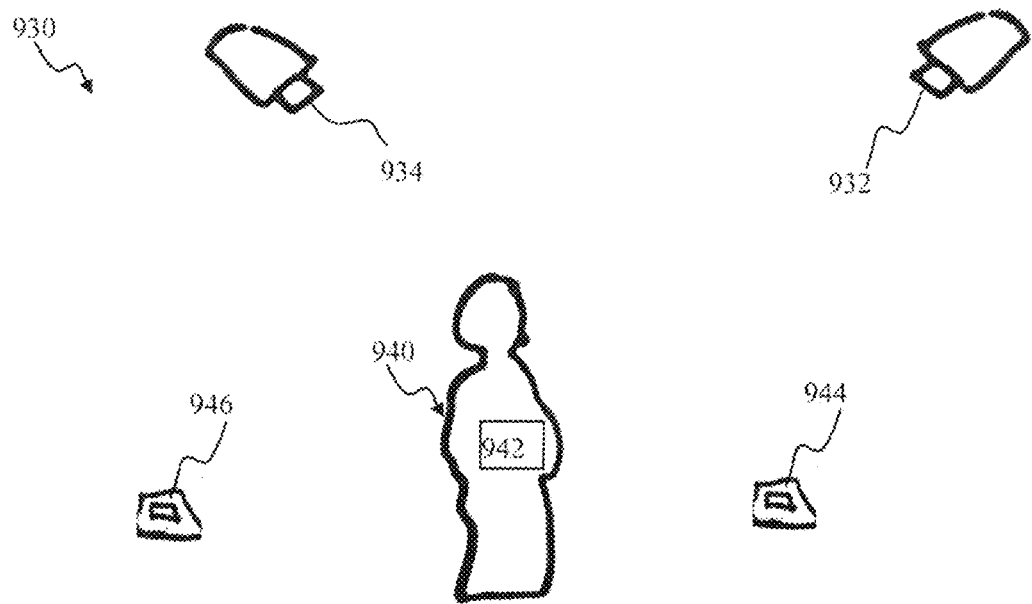
FIG. 9B is a graphical illustration depicting a system including a ceiling-mounted imaging apparatus configured to image an indoor environment and detecting a code on a person and/or objects, in accordance with one or more implementations.

FIG. 9B is a graphical illustration depicting a system including a ceiling-mounted imaging apparatus 930 configured to image an indoor environment and detecting a code 942 on a person and/or objects, in accordance with one or more implementations. The system of FIG. 9B may be configured to image a person in an indoor environment detecting any codes on the person, or any objects on their person, or localized the person by virtue of interrupting the path from an known code behind the person or below their feet 944, 946. The location of the person may be sensed and interrelated between multiple cameras 932, 934, based on the presence of shared codes 942, 944 and/or 946 present in both cameras at the same time. These codes may be fixed in the environment or present on the person or vehicle passing through a scene.

Figure 10A:
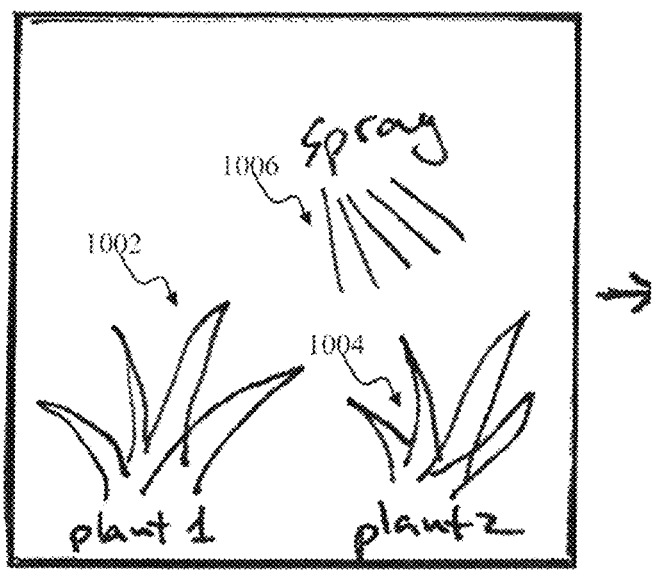
FIG. 10A is a graphical illustration depicting application of an identification material onto a plant for detection by a computerized imaging apparatus, in accordance with one or more implementations.

FIG. 10A is a graphical illustration depicting application of an identification material 1006 onto a plant 1004 for detection by a computerized imaging apparatus, in accordance with one or more implementations.

In one or more implementations, the identification substance 1006 may comprise a spray configured to coat surface of the plant. The identification material may be detectable in an invisible part of electromagnetic spectrum (e.g., IR, UV). In one or more implementations, the substance may be taken up (via, e.g., absorption) by the plant. The substance uptake by the plant may modify absorption light spectra of the plant and/or portions thereof (e.g., leaves). The absorption spectra modification may be configured to be selective for some plants but not others, outside the human spectral visual range. Modification of one plant (e.g., 1004) but not others (e.g., plant 1002) will result in machine-identifiable difference inherent in the modified plant, as described infra.

In one or more implementations, the substance uptake may modify the genetic makeup and/or protein expression of the plant or fungus thereby affecting the absorption spectra of the plant.

Figure 10B:
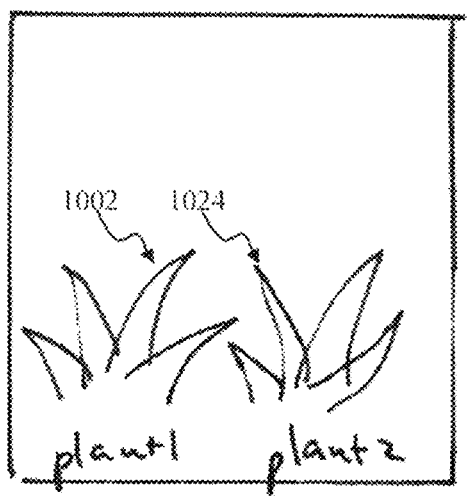
FIG. 10B is a graphical illustration depicting appearance to a human observer of an unmarked plant and a plant marked with an invisible code applied thereon, in accordance with one or more implementations.

FIG. 10B is a graphical illustration depicting appearance to a human observer of an unmarked plant 1002 and a plant 1024 to be marked with an invisible substance applied thereon. In visible portions of electromagnetic spectrum, both the marked and the unmarked plants may appear indistinguishable (based on properties of reflected light) from one another to the human observer.

Figure 10C:
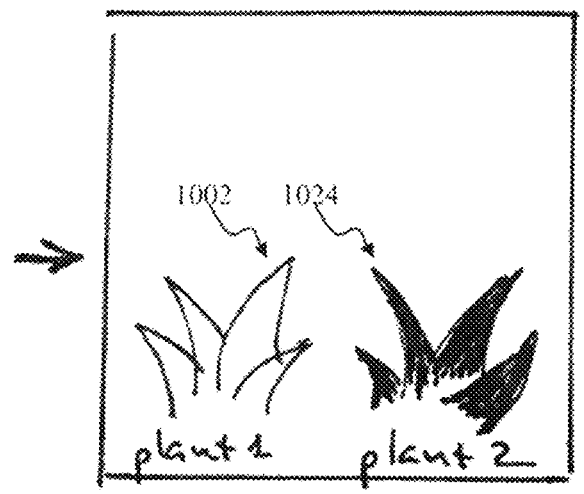
FIG. 10C is an image illustrating detection by a computerized imaging apparatus of a plant marked with an invisible code, in accordance with one or more implementations.

FIG. 10C is an image illustrating detection of a plant 1024 marked with an invisible identification substance 1006 as viewed by a computerized imaging apparatus. In some implementations, the identification substance may be detected in IR or UV portions of the spectrum. Plants 1002, 1024 that were previously indistinguishable by human observer are shown to be distinguishable by a machine observer.

Figure 11:
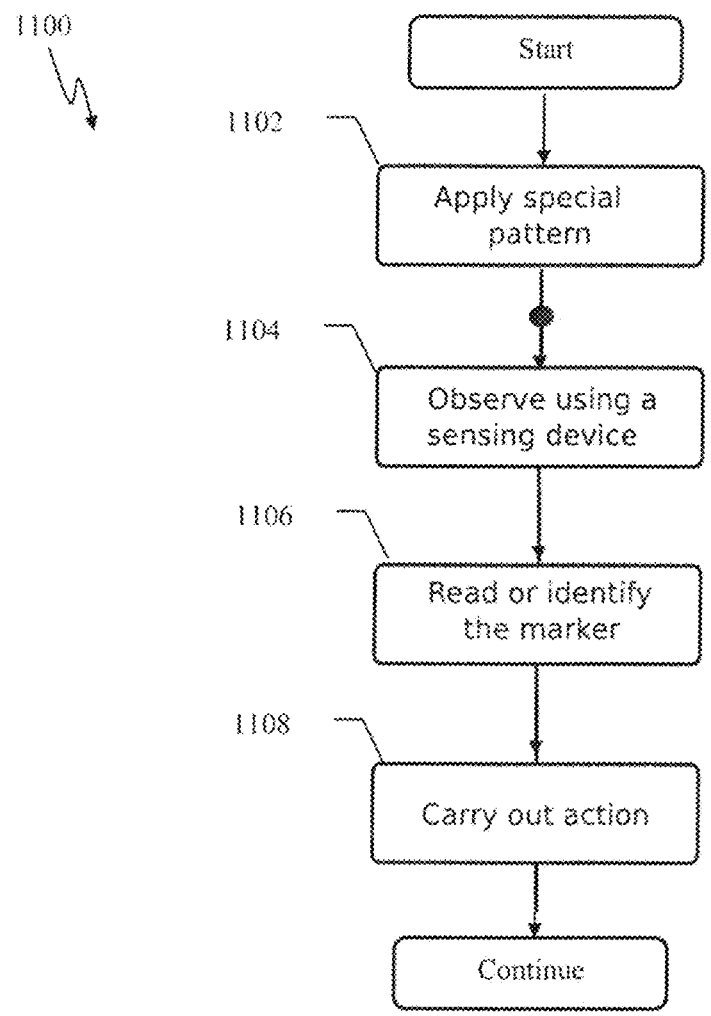
FIG. 11 is a logical flow diagram illustrating a method of using invisible coding for triggering an action based on identification of the code, in accordance with one or more implementations.

FIG. 11 is a logical flow diagram illustrating a method 1100 of using invisible coding for triggering an action based on identification of the code, in accordance with one or more implementations. At operation 1102, a special pattern may be applied (by one or more of the approaches described herein) to an object. The pattern may be inconspicuous or invisible to a human eye, but may be sensed ("seen") by a robot camera or other special sensing device. At operation 1104, the robot may sense the pattern using invisible parts of the electromagnetic spectrum, light polarization, color metamerism, and/or other approaches described herein. The pattern may include a marker (e.g., special symbol or symbols, arrangement, data, absorption pattern, QR code, and/or other markers) that is read or identified at operation 1106 by the robot camera or the special sensing device, and at operation 1108, causes the robot to carry out an appropriate action and/or provides the robot with pertinent information. The process may be repeated as necessary. For example, the apparent distance between pattern elements may provide the robot with data about the distance and angle to the pattern as the robot approaches and/or manipulates the object.

Figure 12:
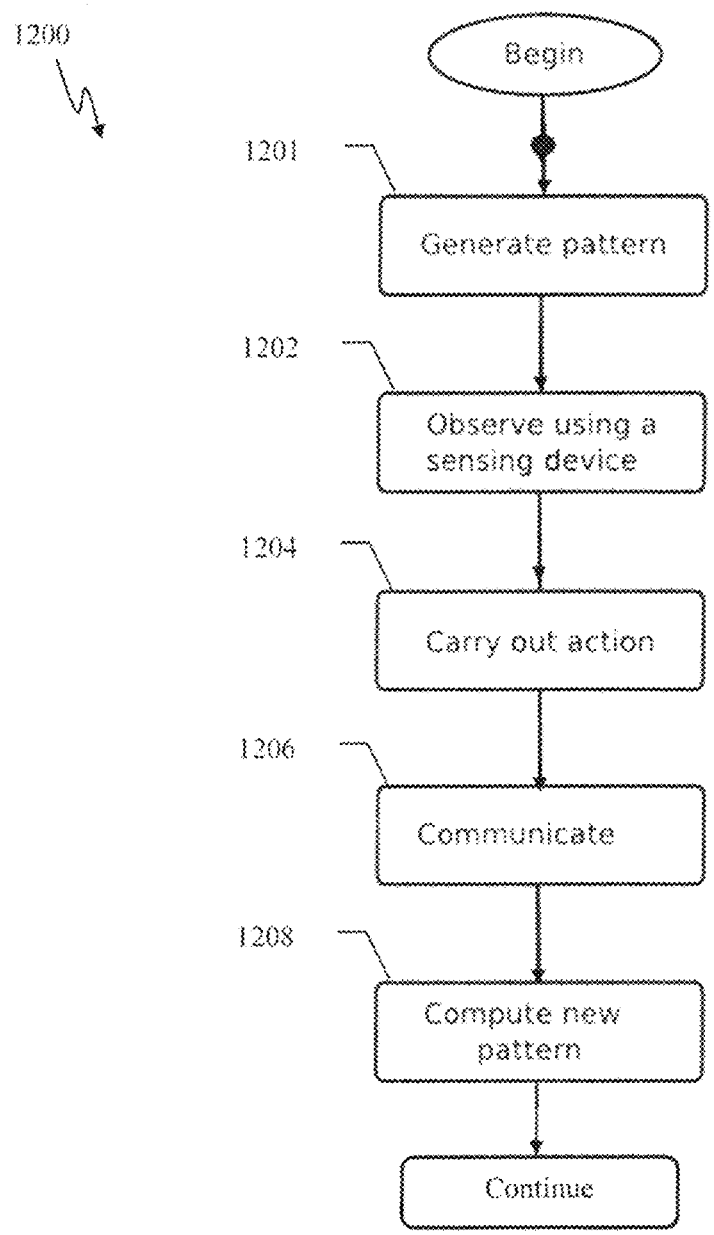
FIG. 12 is a logical flow diagram illustrating a method of pattern adjustment for use with the computer detectable pattern methodology, in accordance with one or more implementations.

FIG. 12 is a logical flow diagram illustrating a method 1200 of pattern adjustment for use with the computer detectable pattern methodology, in accordance with one or more implementations. At operation 1201, a pattern may be generated dynamically (e.g., by means of a CRT, LCD, and/or other means) on an object. The pattern may be inconspicuous or invisible to a human eye, but may be sensed ("seen") by a robot camera or other special sensing device. For example, at operation 1202, the pattern may be sensed using invisible parts of the electromagnetic spectrum, light polarization, color metamerism, and/or other approaches described herein. The pattern may contain a marker (e.g., special symbol or symbols, arrangement, data, absorption pattern, QR code, and/or other marker) that is read or identified by the robot camera or the special sensing device, and causes the robot at operation 1204 to carry out an appropriate action and/or provides the robot with pertinent information. At operation 1206, the robot may then establish a unidirectional or bidirectional communication link with the object (e.g., using the same inconspicuous-pattern method, and/or a conventional link such as WiFi and/or other communications techniques) and inform the object that the pattern has been successfully read. The process may be repeated as necessary. For example, at operation 1208, the object may update the pattern and/or compute a new pattern (e.g., represent the next information packet) in response to being informed that the present pattern has been successfully read by the robot.

Figure 13:
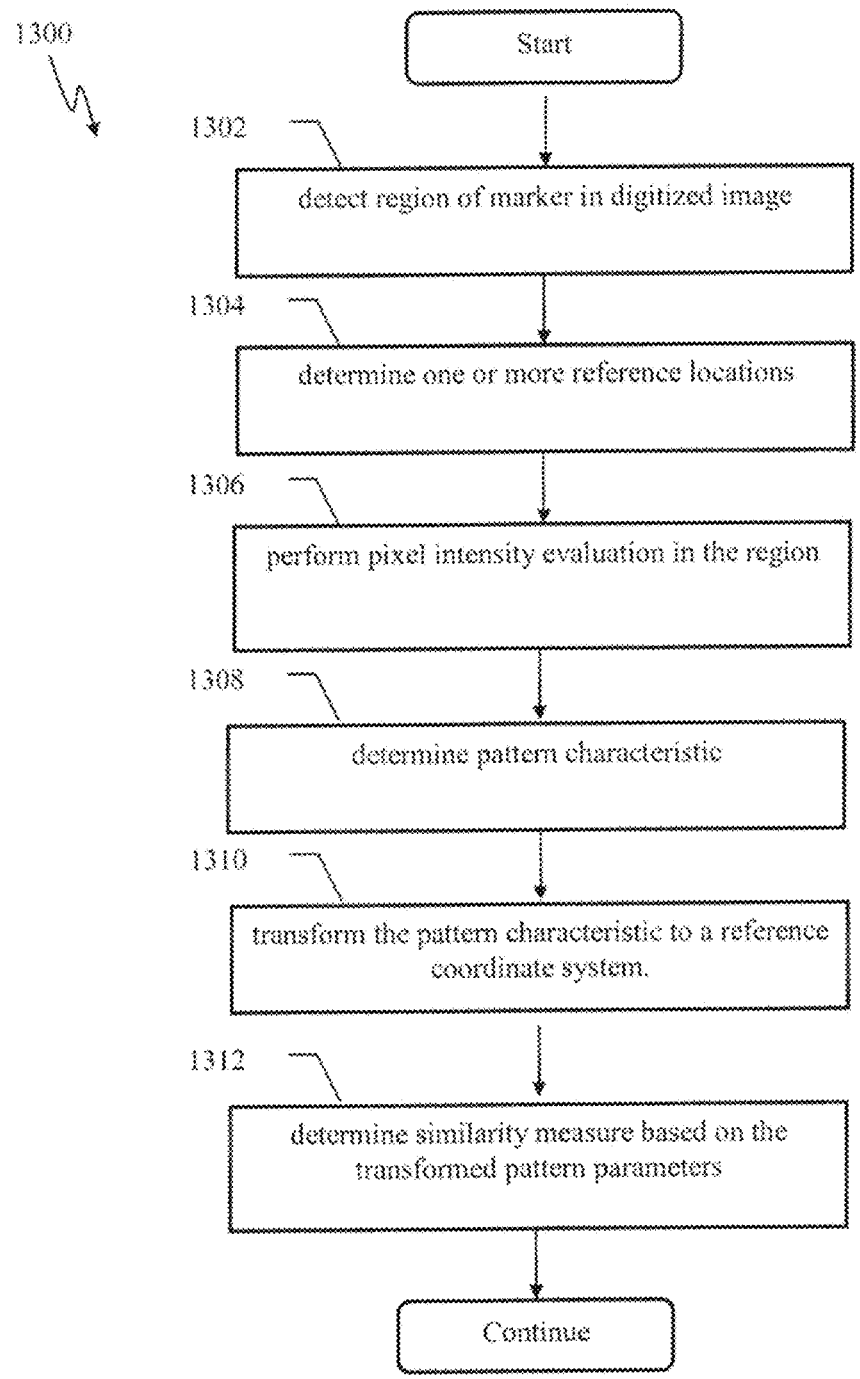
FIG. 13 is a logical flow diagram illustrating a method of detecting a pattern in an image for use with the computer detectable pattern methodology, in accordance with one or more implementations.

FIG. 13 illustrates a method 1300 of detecting a pattern in an image for use with the computer detectable pattern methodology in accordance with one or more implementations.

Figure 15:
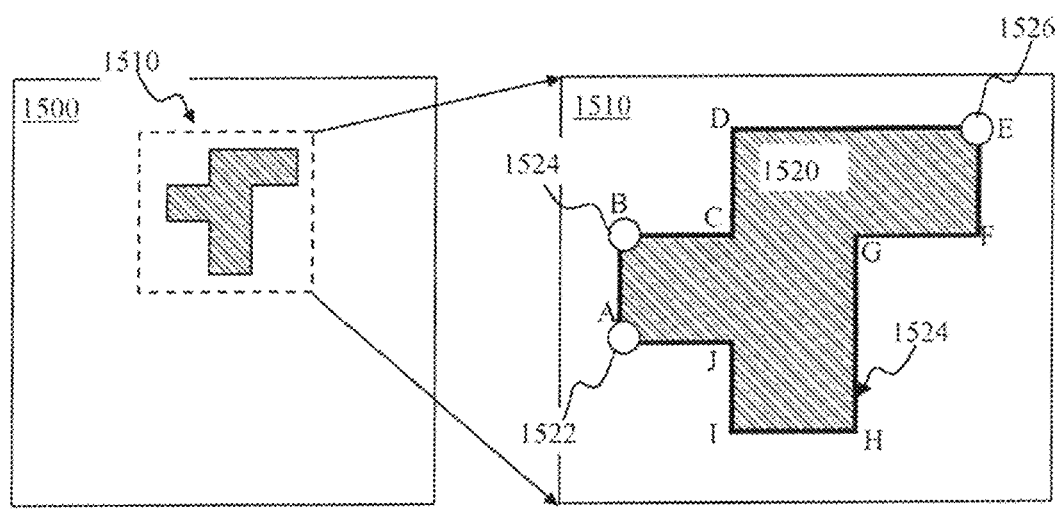
FIG. 15 is block diagram depicting detection of a pattern in an image for use with various implementations of computer detectable pattern methodology, in accordance with one or more implementations.

At operation 1302 of method 1300, a region, may be detected in an image, e.g., the region 1510 in the image 1500 of FIG. 15. In one or more implementations, the region may comprise a visible pattern, e.g., a company logo on a garment, a patch of color (e.g., background), and/or outline of a car (e.g., rear-view of a car trunk 724 comprising the pattern 722 in FIG. 7).

At operation 1304, one or more reference locations may be identified. In some implementations (e.g., such as illustrated in FIG. 15), the reference locations may comprise three non-collinear points (e.g., the points A, B, E 1522, 1524, 1526 in FIG. 15) also referred to as the key points comprising a portion of the pattern (e.g., 1520) being identified. In one or more implementation, the reference locations may comprise locations with a known configuration (e.g., corner locations of the area 314 in FIG. 3). A pattern coordinate frame may be determined based on the reference locations selected at operation 1304.

At operation 1306 pixel intensity may be evaluated within the region. In some implementations, the intensity evaluation may comprise determination of an intensity level (threshold) that may be used to distinguish the code portion (e.g., hashed polygon 1520 in FIG. 15 from the background portion (e.g., white background within the rectangle 1510 in FIG. 15). The code portion may correspond to an intensity level (tone) that may be detected by the computerized imaging apparatus (e.g., the apparatus 200 in FIG. 2 and/or 652 in FIG. 6). In some implementations, the code portion may comprise the invisible markings, filling potentially homogenous bounded forms, on a machine distinguishable background, e.g., the portion 1520 on the background 1510 in FIG. 15.

At operation 1308 pattern characteristic may be determined. In some implementations, the pattern characteristic may comprise one or more contrast inverion boundary (e.g., segment GH 1524 in FIG. 15), one or more corner points (e.g., the point denoted with capital letters A, B, C, D, E, F, G, H, J in FIG. 15), aspect ratio, and/or other parameters.

At operation 1310 the pattern characteristic may be transformed (registered) to a reference coordinate frame. In some implementations, the reference frame may be selected as, fronto-parallel with respect to the plane of the pattern. By way of an illustration, a fronto-parallel plane may comprise a plane perpendicular to an the axis normal to the plane of the pattern (e.g., the axis denoted by arrow 154 in FIG. 1B that may be perpendicular to the plane 160). The coordinate plane transformation may be configured based on a known configuration (e.g., distances in x-y), between the reference locations (e.g., 1522, 1524, 1526 in FIG. 15) with respect to one another in the pattern plane and the configuration for these locations determined from the image (e.g., at operation 1304). In one or more implementations, the transformation may comprise a translation and/or rotation in 2D or 3D space of one or more of the contrast inversion boundaries and/or one or more corner points.

At operation 1312, a similarity measure may be determined. In one or more implementations, the similarity map may comprise a comparison of the transformed pattern parameters to a template, a hash (e.g., perimeter, area, median distance, e.g., 502 in FIG. 5, distance variance), and/or other operations configured to enable a computationally efficient determination as to whether an observed pattern corresponds to a known pattern (code).

FIG. 14A is a graphical illustration depicting application of an expression agent 1406 to a living plant 1404 to enable subsequent identification by a computerized imaging apparatus in accordance with one or more implementations.

The expression agent 1406 may be applied via watering or other form of targeted application method to one or more select plants. In one or more implementations, the expression agent may comprise a substance that may be taken up (absorbed) by the plant via leaves and/or roots. The substance uptake by the plant may modify absorption light spectra of the plant and/or portions thereof (e.g., leaves), as illustrated by the plant 1414 in FIG. 14B. The absorption spectra modification outside the human spectral visual range may be configured for some selected plants (e.g., 1404) but not the other 1402.

In one or more implementations, the substance uptake may modify the genetic makeup and/or protein expression of the plant or fungus thereby affecting the absorption spectra of the plant (e.g., the plant 1414).

FIG. 14C illustrates appearance to a human observer of an unmarked plant 1422 and a plant 1424 marked with the expression agent. In visible portion of electromagnetic spectrum, both the marked 1424 and the unmarked plants 1422 may appear indistinguishable (based on properties of reflected light) from one another FIG. 14D illustrates detection by a computerized imaging apparatus of a plant 1424 marked with the expression agent identification. Marked plant 1424 is clearly identifiable and distinguishable from unmarked plant 1422 from the viewpoint of the imaging apparatus, enabling the imaging apparatus or another entity (e.g., human viewer, other apparatus) to carry out an action based on the identification (e.g., operations 1108, 1204, 1208). In some implementations, the identification substance may be detected in IR or UV portions of the spectrum.

It will be recognized that while certain aspects of the disclosure are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the invention. This description is in no way meant to be limiting, but rather should be taken as illustrative of the general principles of the invention. The scope of the disclosure should be determined with reference to the claims.

What is claimed is:

1. A method of detecting an object by a computerized imaging apparatus, the method comprising:
   sensing a portion of a pattern on the object; and
   identifying the object based on the sensed portion of the pattern;
      wherein sensing the portion of the pattern comprises sensing a first medium that is absorbent at a given wavelength range outside a given human-visible spectral range and a second medium that is less absorbent in the given spectral range relative to the first medium;
   wherein the first medium and the second medium comprise fiber threads woven into a textile of the object; and
   wherein the pattern comprises at least one medium that is undetectable via wavelengths that are visible to a human eye but detectable by the computerized imaging apparatus.

2. The method of claim 1, wherein the first medium and the second medium comprise material that was printed onto the object by a 3-D printing process.

3. The method of claim 1, wherein the sensing the portion of the pattern on the object comprises sensing a given wavelength range that comprises an infrared portion or an ultraviolet portion.

4. The method of claim 1, wherein sensing the portion of the pattern comprises sensing a spectrum of metameric coloration.

5. The method of claim 1, wherein sensing the portion of the pattern comprises sensing a polarized composition of reflected light.

6. The method of claim 5, wherein responsive to an electro-optical device changing a composition of the polarized composition of reflected light, identifying the changed composition of the polarized reflected light.

7. An article of manufacture, comprising:
   a first thread type characterized by a first optical property and a second thread type characterized by a second optical property, the threads of the first type and the second type combined into a pattern on a textile fabric forming at least a portion of the article of manufacture;
   wherein:
      the pattern comprises one or more geometric shapes with distances;
      the first optical property and the second optical property are different and indistinguishable by a human eye; and
      the first optical property and the second optical property are selected to be distinguishable by an imaging sensor.

8. The article of claim 7, wherein the first optical property is distinguishable from the second optical property by the imaging sensor based on one or more of light reflectance, wavelength, or polarization.

9. The article of claim 7, wherein the pattern further comprises a portion that is visible to the human eye.

10. A processor configured to execute routines for performing operations for detecting an object using a computerized imaging apparatus, the operations comprising:
  sensing a pattern on the object by:
    sensing a first medium that is absorbent at a given wavelength range outside a given human-visible spectral range; and
    sensing a second medium that is less absorbent in the given spectral range relative to the first medium;
      wherein the first medium is undetectable via wavelengths that are visible to a human eye but detectable by the computerized imaging apparatus; and
      wherein the first medium and the second medium comprise fiber threads woven into a textile of the object; and
  identifying the object based on the sensed pattern.

11. The processor of claim 10, wherein the first medium and the second medium comprise material that was printed onto the object by a 3-D printing process.

12. The processor of claim 10, wherein sensing the pattern comprises sensing a spectrum of metameric coloration.

13. The processor of claim 10, wherein sensing the pattern comprises sensing a polarized composition of reflected light.

14. The processor of claim 13, wherein responsive to an electro-optical device changing a composition of the polarized composition of reflected light, the operations further comprise:
  identifying the changed composition of the polarized reflected light.

15. The processor of claim 10, wherein sensing the pattern on the object comprises sensing a given wavelength range that comprises an infrared or an ultraviolet portion.

* * * * *